United States Patent
Shimizu et al.

(10) Patent No.: US 10,962,859 B2
(45) Date of Patent: Mar. 30, 2021

(54) IMAGING APPARATUS

(71) Applicant: MAXELL, LTD., Kyoto (JP)

(72) Inventors: Takuya Shimizu, Kyoto (JP); Hiroshi Shimizu, Kyoto (JP); Ryuji Nishimura, Kyoto (JP)

(73) Assignee: MAXELL, LTD., Kyoto (JP)

( * ) Notice: Subject to any disclaimer, the term of this patent is extended or adjusted under 35 U.S.C. 154(b) by 127 days.

(21) Appl. No.: 16/320,494

(22) PCT Filed: May 30, 2017

(86) PCT No.: PCT/JP2017/020105
§ 371 (c)(1),
(2) Date: Jan. 25, 2019

(87) PCT Pub. No.: WO2018/020816
PCT Pub. Date: Feb. 1, 2018

(65) Prior Publication Data
US 2020/0301248 A1    Sep. 24, 2020

(30) Foreign Application Priority Data

Jul. 29, 2016 (JP) .............................. JP2016-149630
Nov. 30, 2016 (JP) .............................. JP2016-232462

(51) Int. Cl.
*G03B 13/06* (2006.01)
*H04N 5/232* (2006.01)
*H04N 5/225* (2006.01)

(52) U.S. Cl.
CPC ......... *G03B 13/06* (2013.01); *H04N 5/22525* (2018.08); *H04N 5/232935* (2018.08); *H04N 5/232939* (2018.08); *H04N 5/232933* (2018.08)

(58) Field of Classification Search
CPC ............ G03B 13/06; H04N 5/232939; H04N 5/22525
See application file for complete search history.

(56) References Cited

U.S. PATENT DOCUMENTS 8,811,948 B2    8/2014    Bandyopadhyay et al.
9,521,247 B2   12/2016    Bandyopadhyay et al.
(Continued)

FOREIGN PATENT DOCUMENTS

JP    2004-104335 A    4/2004
JP    2010-028759 A    2/2010
(Continued)

OTHER PUBLICATIONS

Japanese Office Action received in corresponding Japanese Application No. 2016-232462 dated Apr. 7, 2020.
(Continued)

*Primary Examiner* — Timothy J Henn
(74) *Attorney, Agent, or Firm* — Mattingly & Malur, PC

(57) ABSTRACT

An imaging apparatus has: an imaging optical system; an imaging element configured to receive light transmitted through the imaging optical system to generate an electric signal; a main body; a display device provided on a back face of the main body and capable of displaying an image generated on the basis of the electric signal generated by the imaging element; and an electronic viewfinder provided inside the main body and capable of displaying the image generated on the basis of the electric signal generated by the imaging element, wherein an eyepiece part of the electronic viewfinder is provided to a transmissive region of the display device.

18 Claims, 30 Drawing Sheets

(56) References Cited

U.S. PATENT DOCUMENTS

| | | | |
|---|---|---|---|
| 2005/0286884 A1* | 12/2005 | Otsuka | H04N 5/2251 |
| | | | 396/287 |
| 2010/0060771 A1 | 3/2010 | Shintani | |
| 2011/0164164 A1 | 7/2011 | Aoki et al. | |
| 2014/0320723 A1 | 10/2014 | Shirono | |
| 2015/0049236 A1* | 2/2015 | Kim | G03B 13/08 |
| | | | 348/333.09 |
| 2016/0309076 A1* | 10/2016 | Steinberg | G06F 3/0482 |
| 2017/0070606 A1 | 3/2017 | Bandyopadhyay et al. | |

FOREIGN PATENT DOCUMENTS

| | | |
|---|---|---|
| JP | 2010-092028 A | 4/2010 |
| JP | 2013-534121 A | 8/2013 |
| JP | 2014-216761 A | 11/2014 |
| WO | 2010/029767 A1 | 3/2010 |

OTHER PUBLICATIONS

International Search Report of PCT/JP2017/020105 dated Aug. 22, 2017.

\* cited by examiner

HORIZONTAL POSITION SHOOTING

VERTICAL POSITION SHOOTING

FIG. 7
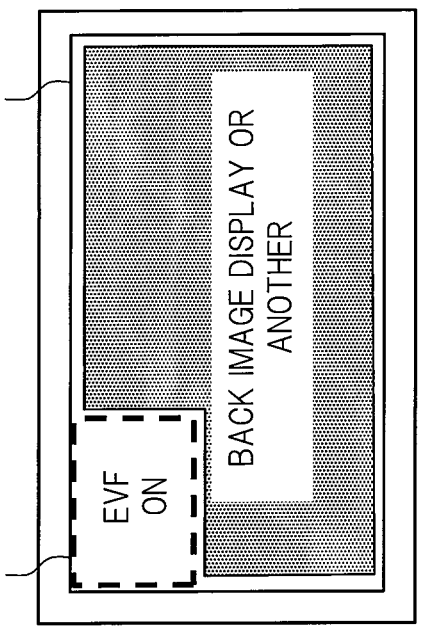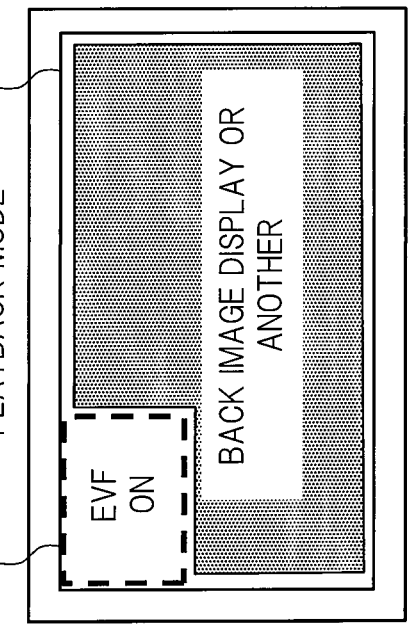
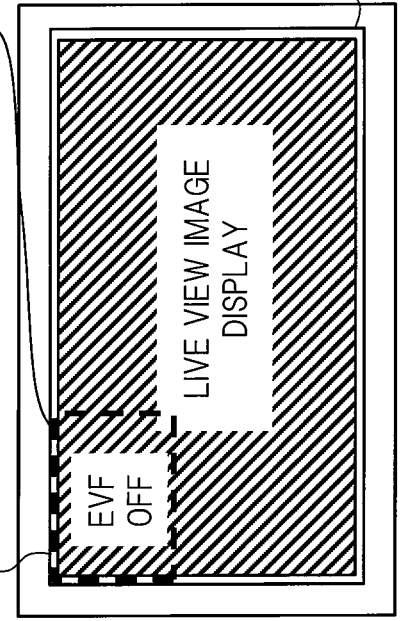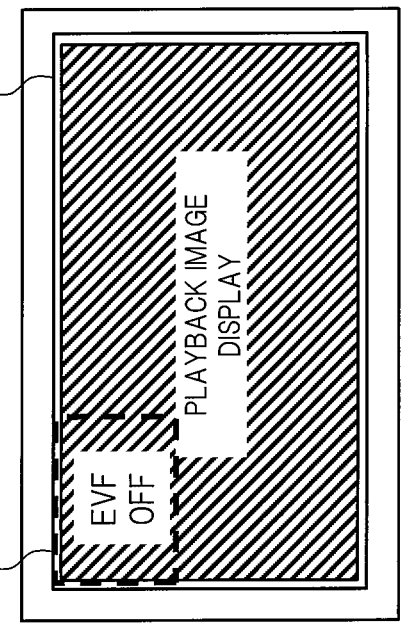

FIG. 10
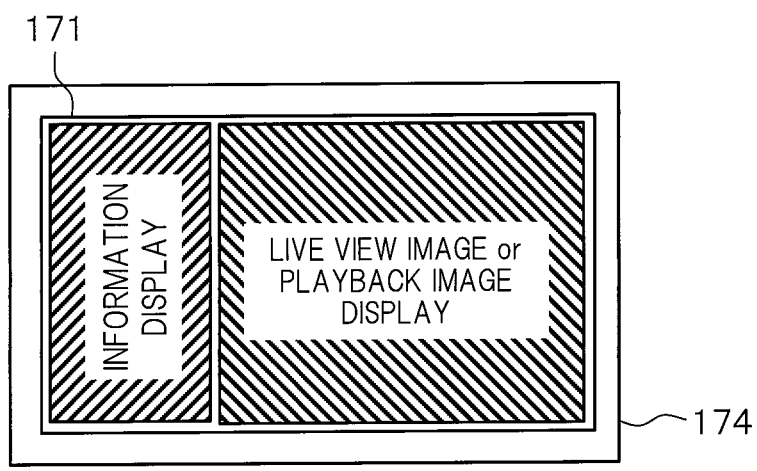
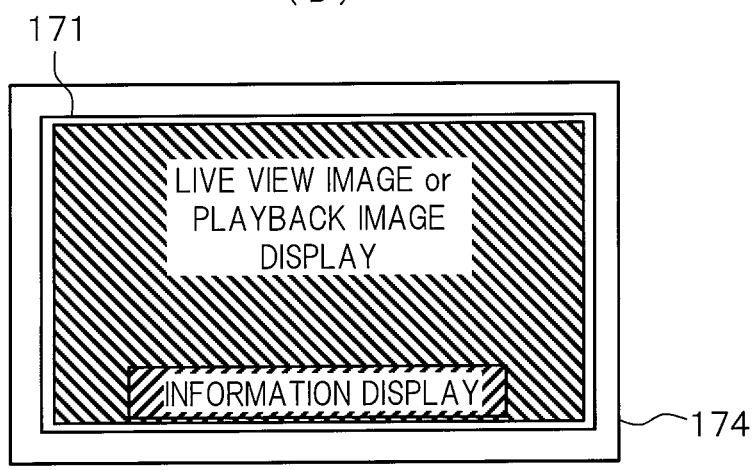

FIG. 11

| | BACK FACE DISPLAY MODE | EVF DISPLAY MODE |
|---|---|---|
| EYE CONTACT DETECTION SENSOR 131 | NO EYE CONTACT DETECTED | EYE CONTACT DETECTED |
| DISPLAY DEVICE 150 | ON WITH LIGHT EMISSION DIPLAY OF IMAGE OR THE LIKE (BACK FACE LIVE VIEW MODE / BACK FACE PLAYBACK MODE) | OFF NO LIGHT EMISSION TRANSMISSIVE STATE |
| EVF DISPLAY ELEMENT171 (EVF170) | OFF | ON WITH LIGHT EMISSION DIPLAY OF IMAGE OR THE LIKE (EVF LIVE VIEW MODE / EVF PLAYBACK MODE) |

FIG. 20
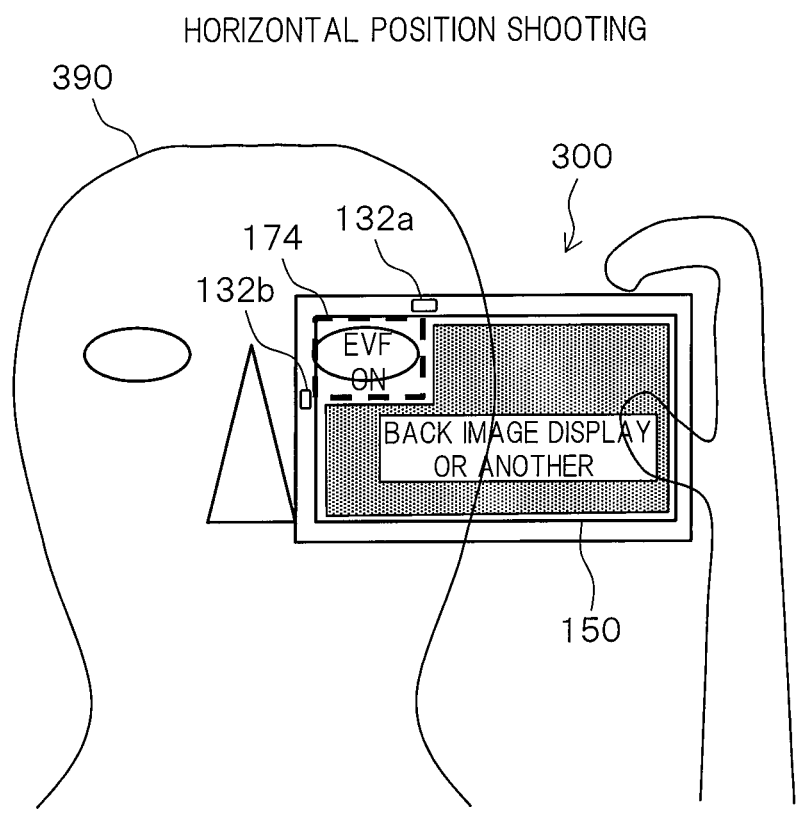
HORIZONTAL POSITION SHOOTING
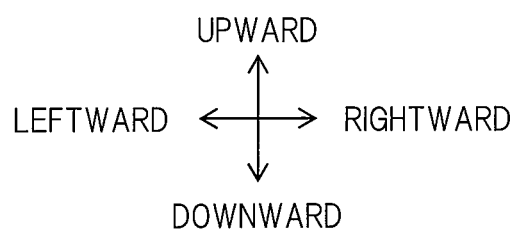
DIRECTIONS VIEWED FROM USER SIDE

FIG. 25

| | | | | |
|---|---|---|---|---|
| FIRST EYE CONTACT DETECTION SENSOR 132a | NO APPROACHING | NO APPROACHING | APPROACHING | APPROACHING |
| SECOND EYE CONTACT DETECTION SENSOR 132b | NO APPROACHING | APPROACHING | NO APPROACHING | APPROACHING |
| EYE CONTACT DETERMINATION | NO EYE CONTACT DETECTED | NO EYE CONTACT DETECTED (TOUCH OPERATION) | NO EYE CONTACT DETECTED (TOUCH OPERATION) | EYE CONTACT DETECTED |
| DISPLAY MODE | BACK FACE DISPLAY MODE | BACK FACE DISPLAY MODE | BACK FACE DISPLAY MODE | EVF DISPLAY MODE |
| DISPLAY DEVICE 150 | ON WITH LIGHT EMISSION DIPLAY OF IMAGE OR THE LIKE (BACK FACE LIVE VIEW MODE / BACK FACE PLAYBACK MODE) | ON WITH LIGHT EMISSION DIPLAY OF IMAGE OR THE LIKE (BACK FACE LIVE VIEW MODE / BACK FACE PLAYBACK MODE) | ON WITH LIGHT EMISSION DIPLAY OF IMAGE OR THE LIKE (BACK FACE LIVE VIEW MODE / BACK FACE PLAYBACK MODE) | OFF NO LIGHT EMISSION TRANSMISSIVE STATE |
| EVF DISPLAY ELEMENT 171 | OFF | OFF | OFF | ON WITH LIGHT EMISSION DIPLAY OF IMAGE OR THE LIKE (EVF LIVE VIEW MODE / EVF PLAYBACK MODE) |
| TOUCH SENSOR 180 | ON | ON | ON | OFF (OR "ON" IN PARTIAL REGION) |

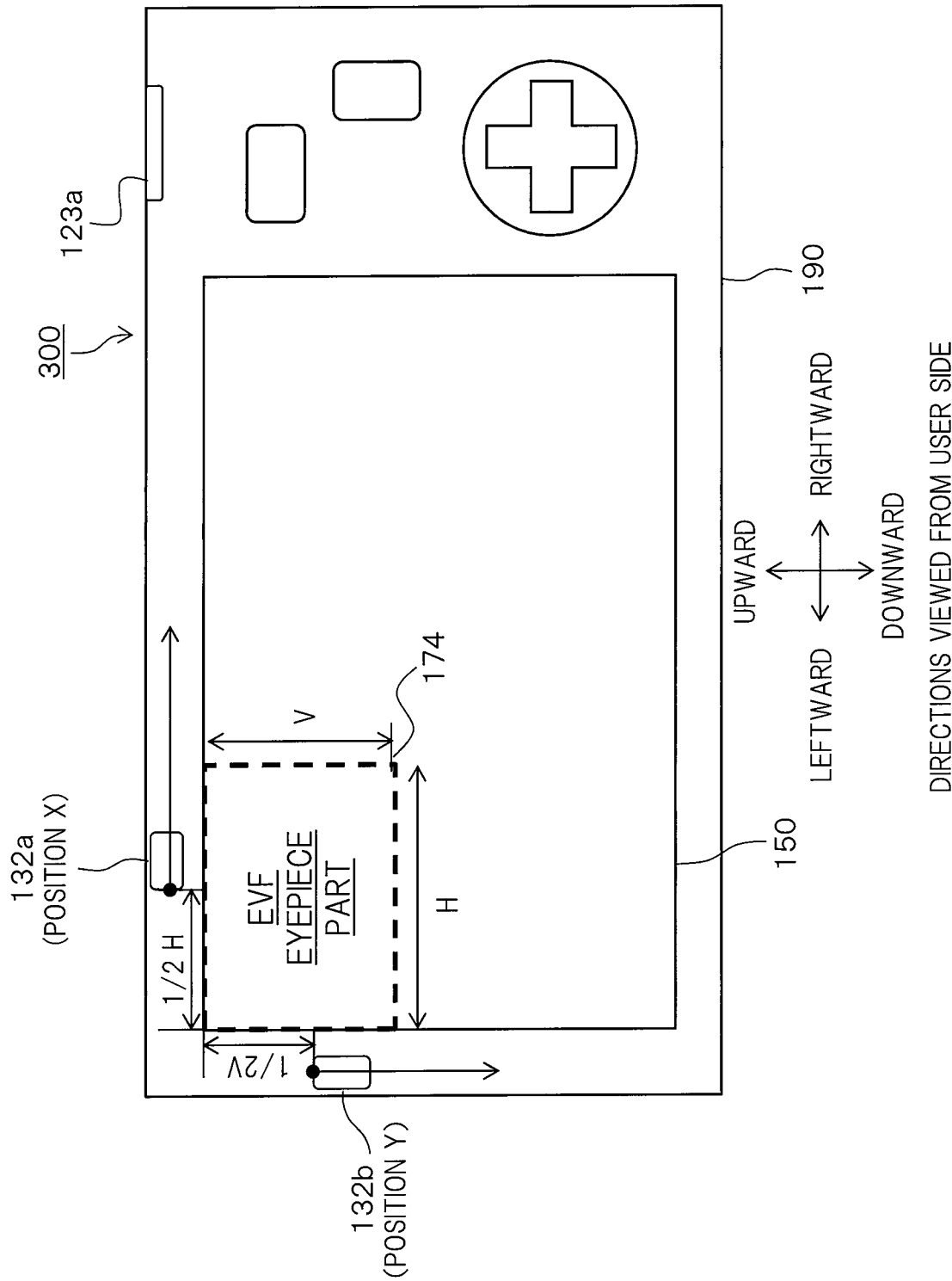

IMAGING APPARATUS

TECHNICAL FIELD

The present invention related to an imaging apparatus.

BACKGROUND ART

In recent years, many manufactures have enriched their lineups of compact digital cameras and mirrorless digital cameras, and have intended to differentiate between upper-end models and lower-end models. In the upper-end models, for example, an electronic viewfinder (EVF) is built in a main body of the digital camera. On the other hand, the electronic viewfinder in the lower-end model is configured to be externally added as an option.

Some digital cameras of the upper-end model, each having a built-in electronic viewfinder, are provided with a protrusion on an upper part of the main body, others having a flat upper part of the main body, and the like.

Patent Document 1 shows one example of the digital camera provided with a protrusion on the upper part of the main body. In the digital camera in Patent Document 1, a liquid crystal display is provided on a back face of the main body, and an eyepiece part of the electronic viewfinder is provided to the protrusion on the upper part of the main body.

Patent Document 2 shows one example of the digital camera of the type having the flat upper part of the main body. In the digital camera in Patent Document 2, a display apparatus and the eyepiece part of the electronic viewfinder are each provided on the back face of the camera main body.

RELATED ART DOCUMENTS

Patent Documents

Patent Document 1: International Patent Publication No. WO2010/029767

Patent Document 2: Japanese Patent Application Laid-Open Publication Application No. JP2010-92028

SUMMARY OF THE INVENTION

Problems to be Solved by the Invention

In the digital camera provided with a protrusion on an upper part of the main body, since the eyepiece part of the EVF is provided to the protrusion, the back face of the main body including a display device or the like can be enhanced in flexibility of layout, but the protrusion tends to impair compactness or portability.

To the contrary, in a digital camera provided with a main body having a flat upper part, the compactness or the portability is not impaired. However, since the display apparatus, the eyepiece part of the EVF, and the like are provided on the back face of the main body, a region area of the eyepiece part of the EVF and a display part area of the display apparatus have a tradeoff relationship. For example, there is a limitation on a design such as a requirement that the display part area of the display apparatus is reduced in order to secure the region area of the eyepiece part of the EVF. That is, the flexibility of the back face of the main body is lowered.

Therefore, an object of the present invention is to provide an imaging apparatus having a display device and an eyepiece part of an electronic viewfinder, each preferably arranged in a back face of a main body thereof.

Means for Solving the Problems

A summary of one or more representative examples of inventions disclosed in the present patent application is as follows.

According to one aspect of the present invention, there is provided an imaging apparatus comprising: an imaging optical system; an imaging element configured to receive light transmitted through the imaging optical system to generate an electric signal; a main body; a display device provided on a back face of the main body and capable of displaying an image generated on the basis of the electric signal generated by the imaging element; and an electronic viewfinder provided inside the main body and capable of displaying the image generated on the basis of the electric signal generated by the imaging element, wherein an eyepiece part of the electronic viewfinder is provided to a transmissive region of the display device.

Effects of the Invention

Advantageous effects obtained by the representative examples of the invention disclosed in the present patent application are as follows.

That is, according to one embodiment of the present invention, it is made possible to provide an imaging apparatus having a display device and an eyepiece part of an electronic viewfinder, each preferably arranged on the back face of the main body.

BRIEF DESCRIPTION OF THE DRAWINGS

FIG. 7 is a view showing contents displayed as one example on a display device in a back face display mode and an EVF display mode according to the first embodiment of the present invention;

FIG. 10 is a view showing an image displayed on an EVF according to the first embodiment of the present invention;

FIG. 11 is a table showing states of respective parts in the back face display mode and the EVF display mode, compared with each other;

FIG. 20 is an explanation view related to the configuration of the imaging apparatus according to the third embodiment of the present invention;

FIG. 25 is an explanation view related to the configuration of the imaging apparatus according to the third embodiment of the present invention;

FIG. 30 is an explanation view related to the configuration of the eye contact detection sensor according to the third embodiment of the present invention.

DETAILED DESCRIPTION OF PREFERRED EMBODIMENTS

Hereinafter, embodiments of the present invention will be described in details with reference to accompanying drawings. Note that the following embodiments are specific examples of the present invention, on the basis of the configuration and various condition of an apparatus to which the present invention is applied, various changes and modifications should be made as needed, the present invention is not limited to the following embodiments, and various changes and modifications may be made by partially combining the following embodiments as needed.

First Embodiment

<Configuration of Imaging Apparatus>

Figure 1:
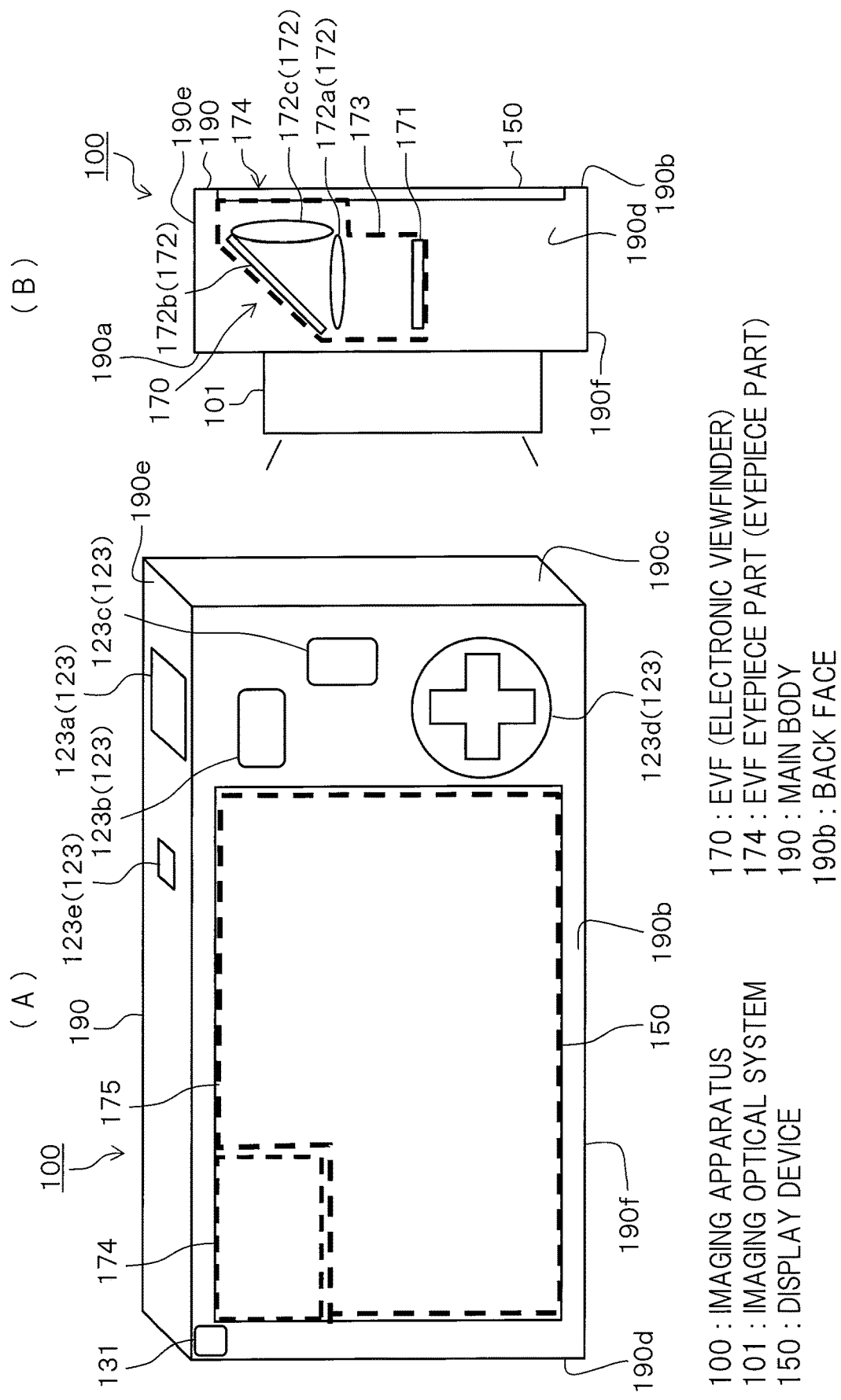
FIG. 1 is a view showing one example of the configuration of an imaging apparatus according to the first embodiment of the present invention.
Figure 2:
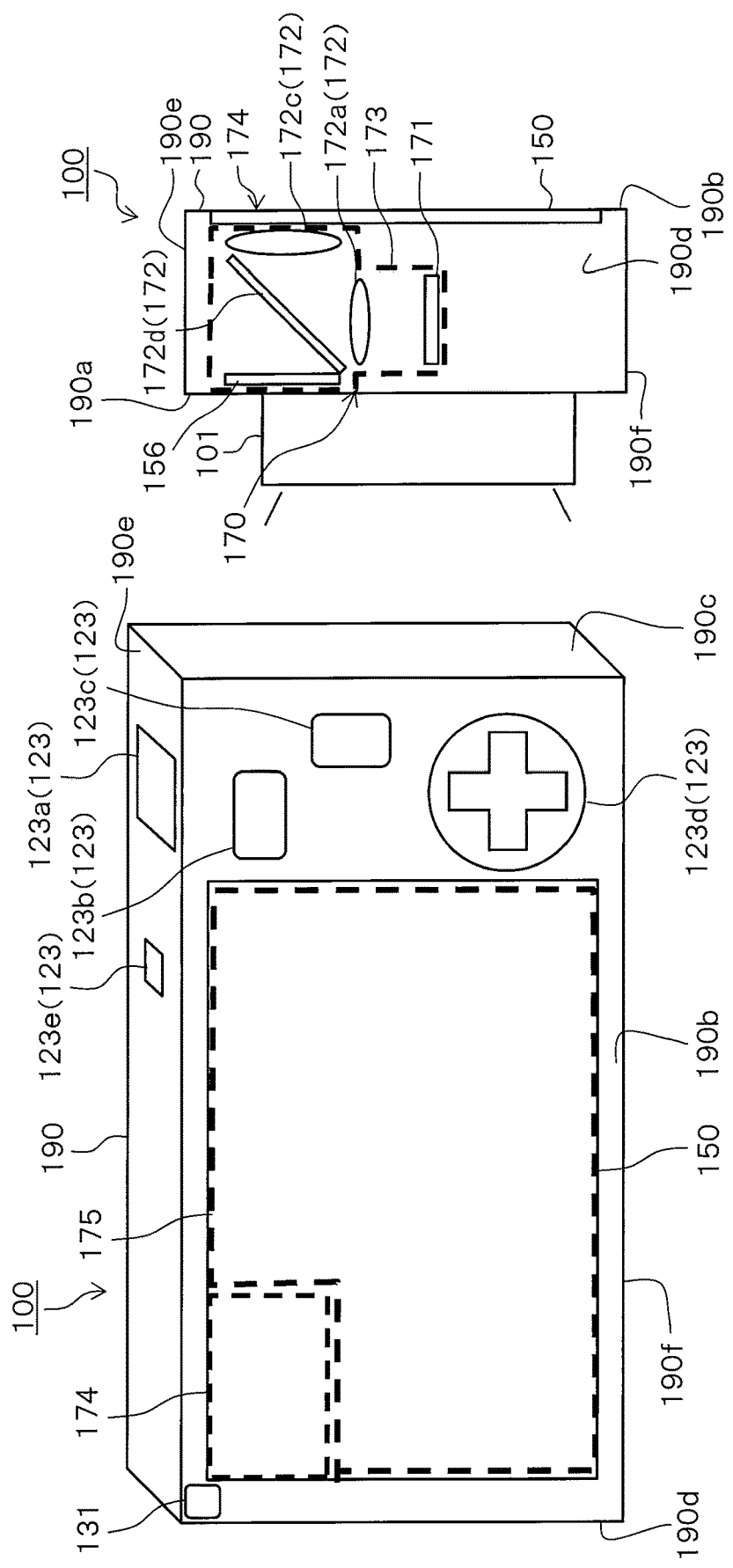
FIG. 2 is a view showing one example of the configuration of the imaging apparatus according to the first embodiment of the present invention.
Figure 3:
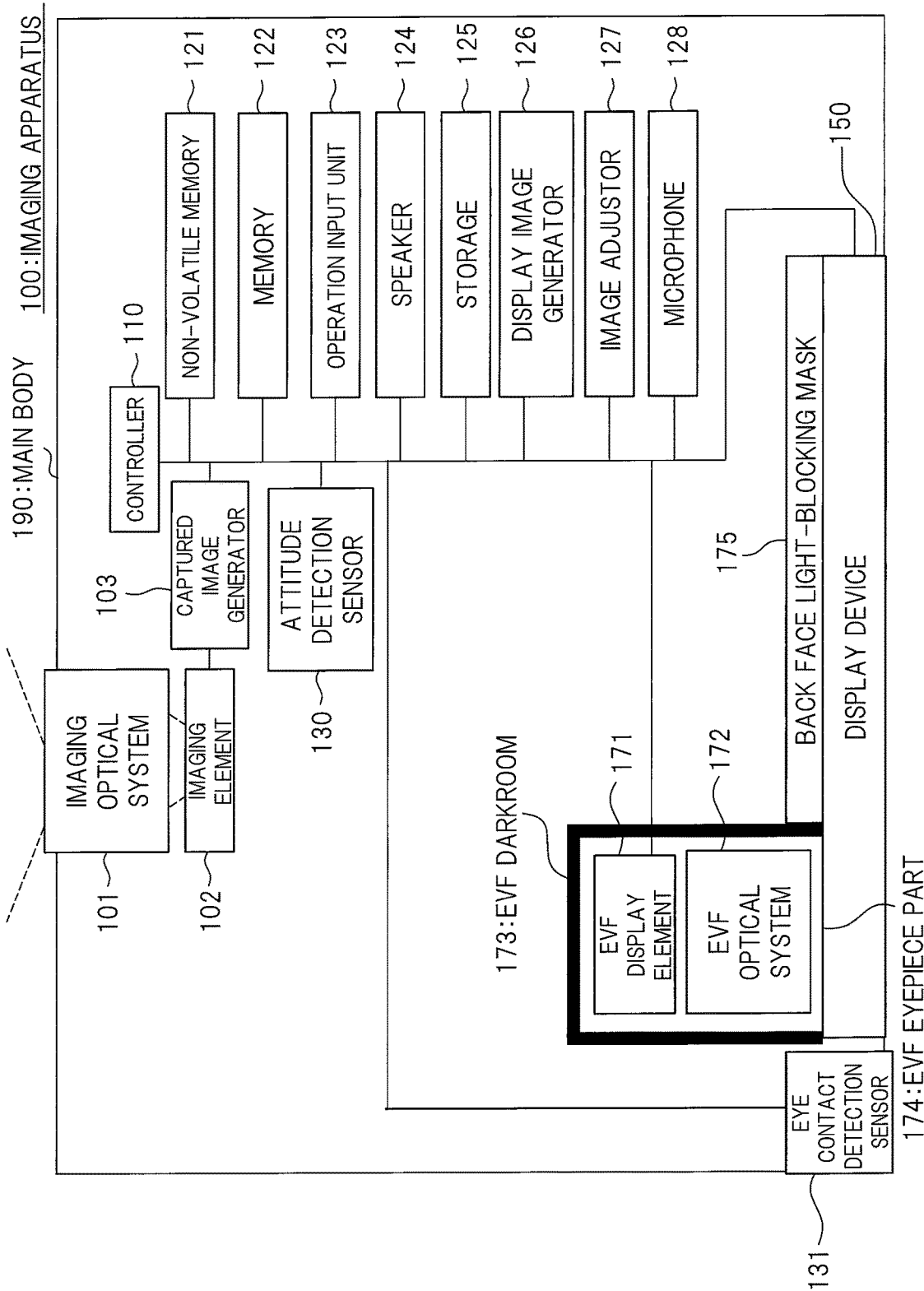
FIG. 3 is a block diagram showing one example of the configuration of the imaging apparatus according to the first embodiment of the present invention.
Figure 4:
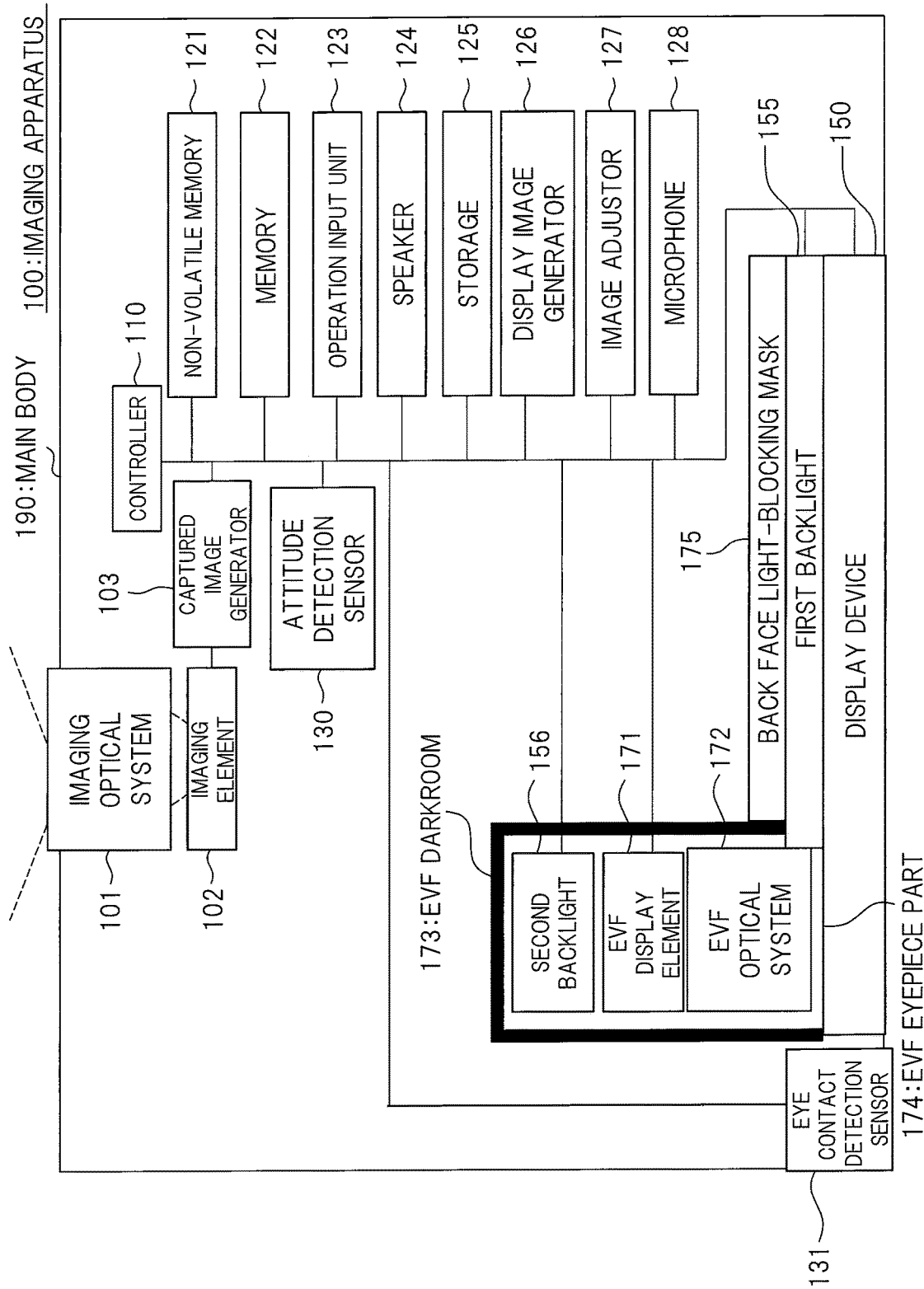
FIG. 4 is a block diagram showing one example of the configuration of the imaging apparatus according to the first embodiment of the present invention.

FIGS. 1 and 2 are views each showing one example of the configuration of an imaging apparatus according to the first embodiment of the present invention. FIGS. 3 and 4 are block diagrams each showing one example of the configuration of the imaging apparatus according to the first embodiment of the present invention. FIGS. 1A and 2A are perspective views of the imaging apparatus as viewed from a back face of a main body, FIGS. 1B and 2B are sectional views of the imaging apparatus as viewed from the left with respect to the back face. It is to be noted that a configuration of an EVF (electronic viewfinder) described later is shown clearly in FIGS. 1B and 2B.

As shown in FIGS. 1 and 3, an imaging apparatus 100 is provided with a main body 190, an imaging optical system 101, an imaging element 102, a captured image generator 103, a non-volatile memory 121, a memory 122, an operation input unit 123, a speaker 124, a storage 125, a display image generator 126, an image adjuster 127, a microphone 128, an attitude detection sensor 130, an eye contact detection sensor 131, a controller 110, a display device 150, an EVF 170, and the like. It is to be noted that the imaging apparatus 100 is provided with a built-in power source (a built-in battery or a replaceable battery accommodated in an accommodation part or the like) or an external power source connection part configured to drive each part, but the illustration thereof is omitted for the sake of simplicity of explanation.

FIGS. 1 and 3 show one example of the display device 150 configured as a type not requiring a backlight. To the contrary, the example shown in FIGS. 2 and 4 is an example of a type where the display device 150 uses a backlight, and is further provided with a first backlight 155 and a second backlight 156. The example shown in FIGS. 1 and 3 and the example shown in FIGS. 2 and 4 are described in a parallel manner.

As shown in FIGS. 1A and 2A, the main body 190 is configured in a parallelepiped shape, for example. The main body 190 has a front face 190a where the imaging optical system 101 of the imaging apparatus 100 takes in light, a back face 190b where the display device 150 is arranged in a horizontally long rectangular shape, an upper face 190e and a bottom face 190f, and a first side face 190c and a second side face 190d respectively disposed at the left and right of the main body 190 with respect to the front face 190a. Therefore, the first side face 190c and the second side face 190d of the main body 190 are disposed at opposite sides of the main body 190 to each other. Each of the parts configuring the imaging apparatus 100 are provided inside the main body 190 and on each of the faces of the main body 190. A region in the vicinity of the upper face 190e of the main body 190 configures a top cover cabinet of the imaging apparatus 100.

For example, as shown in FIGS. 1B, 2B, 3, and 4, the imaging optical system 101 is provided so that a portion thereof protrudes from the front face 190a of the main body 190. This protrusion is referred to as lens barrel. The imaging optical system 101 is provided with a lens, an aperture, and the like, not shown, for example. The imaging optical system 101 takes in incident light from a subject on the front face 190*a* of the main body 190. For example, in FIGS. 1B and 2B, an example where light at a predetermined angle of view from the front face 190*a* of the main body 190 is taken in from the imaging optical system 101 is shown. The taken-in incident light is condensed by a lens (not shown), and the imaging element 102 is irradiated with the condensed incident light. Such a configuration of the imaging optical system 101 can be obtained by utilizing a known technique and is not limited to a specific configuration in the invention of the present application. It is to be noted that in a case where a retractable structure is adopted, the lens barrel part of the imaging optical system 101 may be configured to project from the front face 190*a* of the main body 190 when a power source of the imaging apparatus 100 is turned on, and to retract the part projecting from the front face 190*a* into the main body 190 and when the power source of the imaging apparatus 100 is turned off.

The imaging element 102 is composed of, for example, a CMOS (Complementary Metal Oxide Semiconductor), a CCD (Charge Coupled Device) or the like. Incident light emitted from the imaging optical system 101 is accommodated in each pixel of the imaging element 102 as electric charges, and thereby the incident light from the imaging optical system 101 is converted to electronic signals. In this manner, an electric signal as an image signal is generated for each pixel in the imaging element 102. That is, the imaging element 102 receives light passing through the imaging optical system 101 to generate the electric signals. The generated electric signals are outputted from the imaging element 102 to the captured image generator 103.

The captured image generator 103 is configured to generate an image such as captured image of the subject or the like on the basis of the electric signal of each pixel outputted from the imaging element 102. For example, the captured image generator 103 is configured to convert the electric signals outputted from the imaging element 102 to digital image data having a gradation width of predetermined bits to generate the captured image of the subject. Alternately, the captured image generator 103 is configured to generate a HDR (High Dynamic Range) synthesized image on the basis of a plurality of captured images generated with different exposure amounts to the imaging element 102. Furthermore, the captured image generator 103 may be configured to generate a moving image on the basis of electric signals sequentially outputted from the imaging element 102. When the moving image is generated, for example, external sound information is acquired by the microphone 128 described later. The generated captured image, the HDR synthetized image, the moving image, the acquired voice information and the like are outputted from the captured image generator 103 to the storage 125 and stored in the storage 125.

Furthermore, in a back face live view mode and an EVF live view mode described later, the captured image generator 103 sequentially outputs the images generated on the basis of the electric signals sequentially outputted from the imaging element 102 to the display device 150 or an EVF display element 171 so that a live view image is displayed onto the display device 150 or the EVF display element 171.

The non-volatile memory 121 stores various programs for the imaging apparatus 100 to fulfill various functions, a menu image and the like. For example, the non-volatile memory 121 stores various programs such as a program regarding a basic action of the imaging apparatus 100, a program regarding a camera function, a program regarding a sound recognition function and the like. In addition, the non-volatile memory 121 stores setting information regarding the imaging apparatus 100 and the like.

The various programs stored in the non-volatile memory 121 are developed in the memory 122. When each program developed in the memory 122 is executed by the controller 110, a corresponding function owned by each program is fulfilled in the imaging apparatus 100. For example, when the program regarding the basic action is executed, the basic action is realized in the imaging apparatus 100. Furthermore, for example, when the program regarding the camera function is executed, the camera function is fulfilled in the imaging apparatus 100. In addition, for example, the imaging apparatus 100 may be configured so that the sound recognition function is fulfilled when the program regarding the sound recognition function is executed.

The operation input unit 123 is an instruction input unit for inputting an operation instruction to the imaging apparatus 100. As shown in FIGS. 1A and 2A, the operation input unit 123 includes an imaging button 123*a*, a menu button 123*b*, an operation button 123*c*, an operation input key 123*d*, a power source switch 123*e* and the like. Furthermore, an operation button other than these and the like may be provided.

The power source switch 123*e* is provided, for example, on the upper face 190*e* of the main body 190 to perform switching between a power source ON state and a power source OFF state of the imaging apparatus 100. An action of each part described below serves the function of the each part in a power source ON state in principle.

The imaging button 123*a* is provided on the upper face 190*e* of the main body 190. Specifically, as shown FIGS. 1A and 2A, the imaging button 123*a* is provided on the upper face 190*e* of the main body 190 on the same side as the first side face 190*c* of the main body 190. When pressed slightly, the imaging button 123*a* reaches a half-pressed state, and so that focusing on the subject is performed by the imaging optical system 101. Furthermore, when the imaging button 123*a* is pressed strongly, imaging of the subject is performed. It is to be noted that the imaging button 123*a* may be provided on the same side as the second side face 190*d* of the main body.

The menu button 123*b*, the operation button 123*c*, and the operation input key 123*d* are provided on the back face 190*b* of the main body 190 on the same side as the first side face 190*c* of, for example, as shown in FIGS. 1A and 2A. When the menu button 123*b* is operated, the menu screen is displayed, for example, on the display device 150 described later or the like. When the operation button 123*c* is operated, for example, switching between the back face display mode and the EVF display mode described later, switching between the live view mode and playback mode described later, or the like, is performed.

When the operation input key 123*d* is operated, for example, selection of an item subjected to setting change, selection of a content to be changed, or the like, is performed on the menu screen. Furthermore, when the operation input key 123*d* is operated, for example, selection of an image to be displayed on the display device 150 or the like, is performed. In addition, when the operation input key 123*d* is operated, selection of an imaging mode (for example, a normal imaging mode, an HDR imaging mode, a moving image imaging mode, or the like), selection of a focus point, selection of imaging sensitivity, or the like, is performed.

The speaker 124 is configured to output sound regarding the moving image, for example. Furthermore, the speaker 124 is configured to output a shutter sound of the imaging apparatus 100, a notification sound regarding an operation or the like, a warning sound, or the like, for example.

The storage 125 is composed of a non-volatile memory such as, for example, a flash memory, SSD (Solid State Drive), or HDD (Hard Disk Drive). The storage 125 is configured to store, for example, the captured image, an HDR synthetic image, and a moving image generated by the captured image generator 103, sound information regarding the moving image acquired by the microphone 128, and the like. The storage 125 may be provided with not only an internal storage but also a detachable external storage in addition to or instead of the internal storage.

The display image generator 126 configured to generate, for example, various images (for example, an image regarding the above-described setting screen, an imaging mode selection screen, the captured image selection screen, a focus point selection screen and the like) to be displayed on the display device 150 or the EVF 170 described later. Besides these images, the display image generator 126 may be configured to generate an image made by combining a screen of current setting information at an imaging time (for example, various information such as the imaging mode, the sensitivity of the imaging element 102, the shutter speed, the f-number, and a digital level).

The image adjuster 127 is configured to adjust an image to be displayed on the display device 150 and the EVF display element 171. For example, when a file size of the captured image generated or the like is too large to be displayed on the display device 150 or the like, the image adjuster 127 is configured to perform adjustment of an image quality of the captured image so that the captured image can fit into the display device 150. Furthermore, for example, when a file size of the captured image generated is so small that the captured image can be displayed on only a portion of the display device 150, the image adjuster 127 may be configured to perform adjustment of the image quality of the captured image so that the expanded captured image enlarged and can be displayed.

The microphone 128 is configured to acquire sound outside the imaging apparatus 100, for example, when a moving image is imaged. For example, the microphone 128 outputs the acquired sound to the controller 110 and voice data regarding the sound is generated in the controller 110. The generated sound data is outputted and stored in the storage 125.

The attitude detection sensor 130 is composed of, for example, an acceleration sensor. The attitude detection sensor 130 is configured to measure a magnitude and a direction of a gravitational acceleration acting on the imaging apparatus 100. The attitude detection sensor 130 is configured to output the measured magnitude and direction of the gravitational acceleration to the controller 110 as acceleration information, and the controller 110 is configured to detect an attitude of the imaging apparatus 100 on the basis of the acceleration information.

The eye contact detection sensor 131 is configured to detect whether a user is using an EVF eyepiece part 174 of the EVF 170. The eye contact detection sensor 131 is provided to the vicinity of the EVF eyepiece part 174 of the EVF 170. For example, as shown in FIGS. 1A and 2A, the eye contact detection sensor 131 is provided on the back face 190b of the main body 190 in the vicinity of a position of intersection between the second side face 190d and the upper face 190e. As the eye contact detection sensor 131, for example, an infrared type proximity sensor may be used. Furthermore, besides this senor, the eye contact detection sensor 131 may be composed of an induction type detection sensor, a capacitance type detection sensor, an ultrasonic type detection sensor, an electromagnetic wave type detection sensor, or the like. The eye contact detection sensor 131 is configured to output a result of detection of the user near the EVF eyepiece part 174 of the EVF 170 to the controller 110 as user detection information, and the controller 110 is configured to detect whether the user is using the EVF 170 on the basis of the user detection information.

The display device 150 is provided on the back face 190b of the main body 190, and can display the image generated on the basis of the electric signals generated by the imaging element 102. As shown in FIGS. 1A and 2A, the display device 150 is provided on the back face 190b of the main body 190 as to cover a region between the operation input unit 123 (for example, the menu button 123b, the operation button 123c, and the operation input key 123d) and the eye contact detection sensor 131. As shown in in FIGS. 1A and 2A, the display device 150 is configured in a horizontally long rectangular shape. Furthermore, the display device 150 has translucency. The display device 150 is composed of, for example, an organic EL (Electroluminescence) panel, a liquid crystal panel, or the like. A specific structure of the display device having transmissivity can be obtained by using a known structure disclosed, for example, in US Patent Application Publication No. 2015/0098039, or the like.

A self light emitting display device such as an organic EL (Electroluminescence) panel does not require a backlight. Therefore, as a configuration in a case where such a display device requiring no backlight is used, as shown in FIG. 1A, a reverse face light-blocking mask (light-blocking mask) 175 may be provided without providing the backlight between a portion of the back face of the display device 150 excluding the EVF eyepiece part 174 and the main body 190. The reverse face light-blocking mask 175 is made from, for example, resin having translucency or the like. In this case, light transmitted through the display device 150 or light emitted by the display device 150 itself is shielded by the reverse face light-blocking mask 175 in the region of the back face of the display device 150 excluding the EVF eyepiece part 174 and not transmitted into the main body 190.

Furthermore, in a case where a display device such as a liquid crystal panel of a type requiring a backlight for making a user visually recognize a display content is used, a first backlight 155 shown in FIG. 4 may be provided between the portion of the display device 150 excluding the EVF eyepiece part 174 and the reverse face light-blocking mask 175. That is, the first backlight 155 is arranged on a reverse face in a region excluding the EVF eyepiece part 174 of a display region of the display device 150. Here, the light transmitted through the display device 150 or the light emitted by the first backlight 155 is shielded by the reverse face light-blocking mask 175 and does not transmit through the inside of the main body 190. Here, backlighting for the EVF eyepiece part 174 of the display device 150 cannot be brought about the first backlight 155, so that only the EVF eyepiece part 174 of the display device 150 becomes dark. Therefore, for example, as shown in FIG. 2B, in order to realize a backlighting function for the EVF eyepiece part 174 of the display device 150, a second backlight 156 is provided within the EVF 170. A specific configuration and an arrangement of the second backlight 156 are described later.

For example, as shown in in FIGS. 1B and 2B, the EVF 170 is provided inside the main body 190 and can display an image generated on the basis of electric signals generated by the imaging element 102. The EVF 170 is provided with an EVF display element 171, an EVF optical system 172, an EVF darkroom 173, an EVF eyepiece part (eyepiece part) 174, and the like.

The EVF display element 171 is configured to display a playback image (a still image or a moving image) of the captured image generated through the imaging optical system 101, the imaging element 102, and the captured image generator 103, or the like, a live view image, or the like. The EVF display element 171 is configured to display the menu image. The EVF display element 171 is composed of, for example, an organic EL panel, a liquid crystal panel, or the like.

When the display device not requiring a backlight is used in the display device 150, for example, as shown in FIG. 1B, the EVF optical system 172 is configured to have lenses 172a, 172c, and a mirror 172b. As shown in FIGS. 1 and 2, the EVF optical system 172 is arranged on the reverse face of the region of the EVF eyepiece part 174 provided to the region having the transmissivity of the display device 150 as viewed from an outside of the main body 190. Light of an optical image formed by the EVF display element 171 is guided to the EVF eyepiece part 174 via the EVF optical system 172 to form an image on the retina of an eye of the user. That is, the image displayed by the EVF display element 171 is visually recognized at the EVF eyepiece part 174 through the EVF optical system 172.

It is to be noted that an optical design of the EVF optical system 172 may be achieved by using a known technique disclosed in, for example, Japanese Patent Application Laid-Open No. 2005-148487, Japanese Patent Application Laid-Open No. 2007-311925, or the like.

Furthermore, when the display device requiring a backlight is used in the display device 150, for example, as shown in FIG. 2B, the EVF optical system 172 may have the lenses 172a, 172c, a half mirror 172d, and the second backlight 156. When the user is made visually recognize a display content of the EVF display element 171, the second backlight 156 is turned off and light of the optical image formed by the EVF display element 171 is guided to the EVF eyepiece part 174 via the EVF optical system 172 having the half mirror 172d. That is, the image displayed at the EVF display element 171 at this time is visually recognized at the EVF eyepiece part 174 via the EVF optical system 172. When the backlighting function of the second backlight 156 is turned on, light emission of the EVF display element 171 is turned off, and light emitted by the second backlight 156 is transmitted through the half mirror 172d and a portion of the EVF optical system 172 to function as backlight for the EVF eyepiece part 174 of the display device 150. In this manner, by providing the second backlight 156 in the EVF 170, a lack of backlight for the EVF eyepiece part 174 of the display device 150 can be prevented.

It is to be noted that illustration of each element of the EVF optical system 172 within the EVF 170 is omitted in FIGS. 3 and 4 for simplicity of the description.

The EVF darkroom 173 is made from a material having a light-blocking effect, and is provided so as to surround the EVF display element 171, the EVF optical system 172, and the EVF eyepiece part 174. Within the EVF 170, a region excluding the EVF eyepiece part 174 is light-blocked so that a darkroom state is configured within the EVF 170. That is, the EVF 170 have a light-blocking effect excluding the EVF eyepiece part 174. In this manner, since the inside of the EVF 170 is in a darkroom state, light inside the main body 190 does not enter the EVF 170, and furthermore, the EVF 170 is also configured to prevent light within the EVF 170 or light incident on the EVF 170 through the EVF eyepiece part 174 of the display device 150 having transmissivity from entering the main body 190. Therefore, the EVF optical system 172 and the EVF display element 171 are arranged in a space having a light-blocking effect excluding the EVF eyepiece part 174. Furthermore, the second backlight 156 described above is arranged in a space having such a light-blocking effect.

For example, as shown in in FIGS. 1A and 2A, the EVF eyepiece part 174 is provided to a portion of the display device 150. Specifically, the EVF eyepiece part 174 is provided on the display device 150 on the same side as the second side face 190d of the main body 190 and on the same side as the upper face 190e of the main body 190. More specifically, for example, as shown in FIG. 1A, the EVF eyepiece part 174 is provided to the display device 150 in a region on the same side as the second side face 190d and on the same side as the upper face 190e of the display device 150. An opening part of the EVF darkroom 173 is in contact with the display device 150. The EVF eyepiece part 174 is configured integrally with the opening part of the EVF darkroom 173 and the display device 150 in a region in contact with the opening part of the EVF darkroom 173. It is to be noted that when the imaging button 123a is provided on the same sides as the second side face 190d of the main body 190, the EVF eyepiece part 174 is preferably provided to the display device 150 on the same side as the first side face 190c of the main body 190 and on the same side as the upper face 190e of the main body 190. A merit of the arrangement of the EVF eyepiece part 174 is described with reference to FIGS. 5 and 6.

Figure 5:
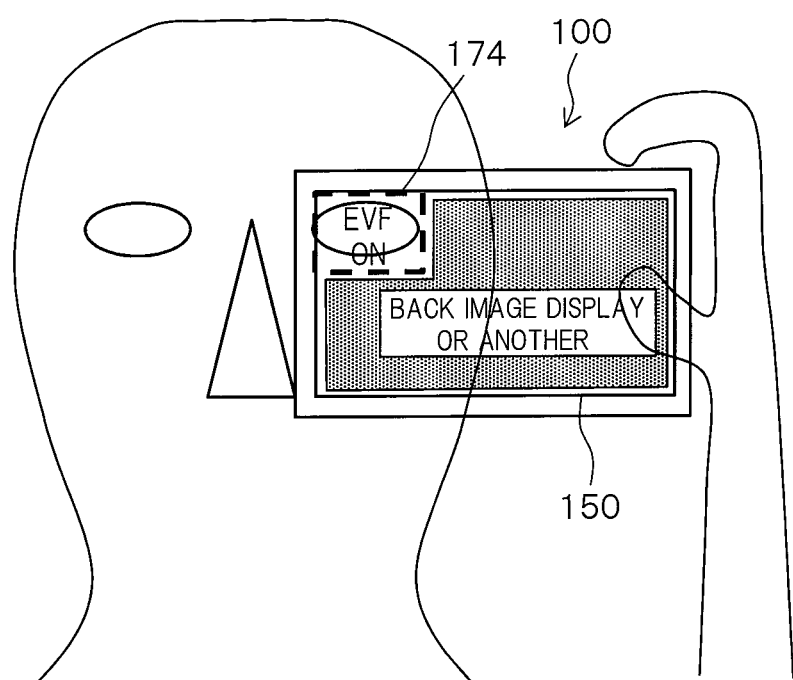
FIG. 5 is a view showing one example on how to hold the imaging apparatus with the imaging apparatus used in a horizontal position.
Figure 6:
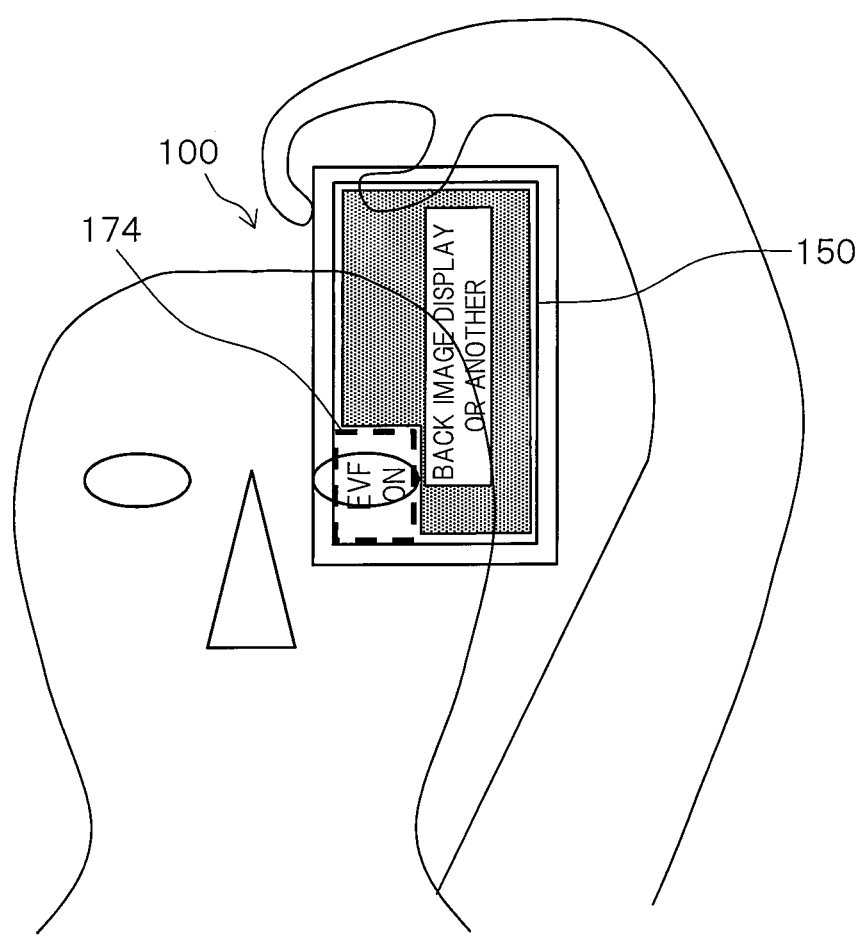
FIG. 6 is a view showing one example on how to hold the imaging apparatus with the imaging apparatus used in a vertical position.

FIG. 5 is a view showing one example on how to hold the imaging apparatus with the imaging apparatus used in a horizontal position. FIG. 6 is a view showing one example on how to hold the imaging apparatus with the imaging apparatus used in a vertical position. When the EVF eyepiece part 174 is arranged in the above-described position, even if the imaging apparatus 100 is used at the horizontal position, for example, as shown in FIG. 5, a hand of a user operating the imaging button 123a and a face of the user peeping through the EVF eyepiece part 174 do not cross each other. Furthermore, even when the imaging apparatus 100 is used in the vertical position, for example, as shown in FIG. 6, the hand of the user operating the imaging button 123a and the face of the user peeping through the EVF eyepiece part 174 do not cross each other.

The controller 110 is composed of, for example, a computer such as microprocessor. The controller 110 is configured to control each part of the imaging apparatus 100 by executing various programs developed in the memory 122.

For example, when executing a program regarding a basic action, the controller 110 performs control regarding the basic action to each of the parts configuring the imaging apparatus 100. For example, when a power source switch (not shown) is operated to turn on the imaging apparatus 100, the controller 110 activates each of the parts of the imaging apparatus 100 on the basis of the program regarding the basic action.

For example, when executing a program regarding the camera function, the controller 110 performs control regarding the camera function to each of the parts configuring the imaging apparatus 100. For example, when the imaging button 123a is operated, the controller 110 controls each of the parts relating to imaging to image the subject. Furthermore, the controller 110 makes each of the parts generate an image such as a still image, a moving image of the subject captured. In addition, the controller 110 controls each of the parts of the imaging apparatus 100 on the basis of an operation to, for example, the menu button 123b, the operation button 123c, the operation input key 123d, or the like.

When executing a program regarding the sound recognition function, the controller 110 performs control regarding the sound recognition function to each of the parts configuring the imaging apparatus 100. For example, the controller 110 makes the speaker 124 output sound, makes the microphone 128 acquire sound, or the like.

<Back Face Display Mode>

Figure 8:
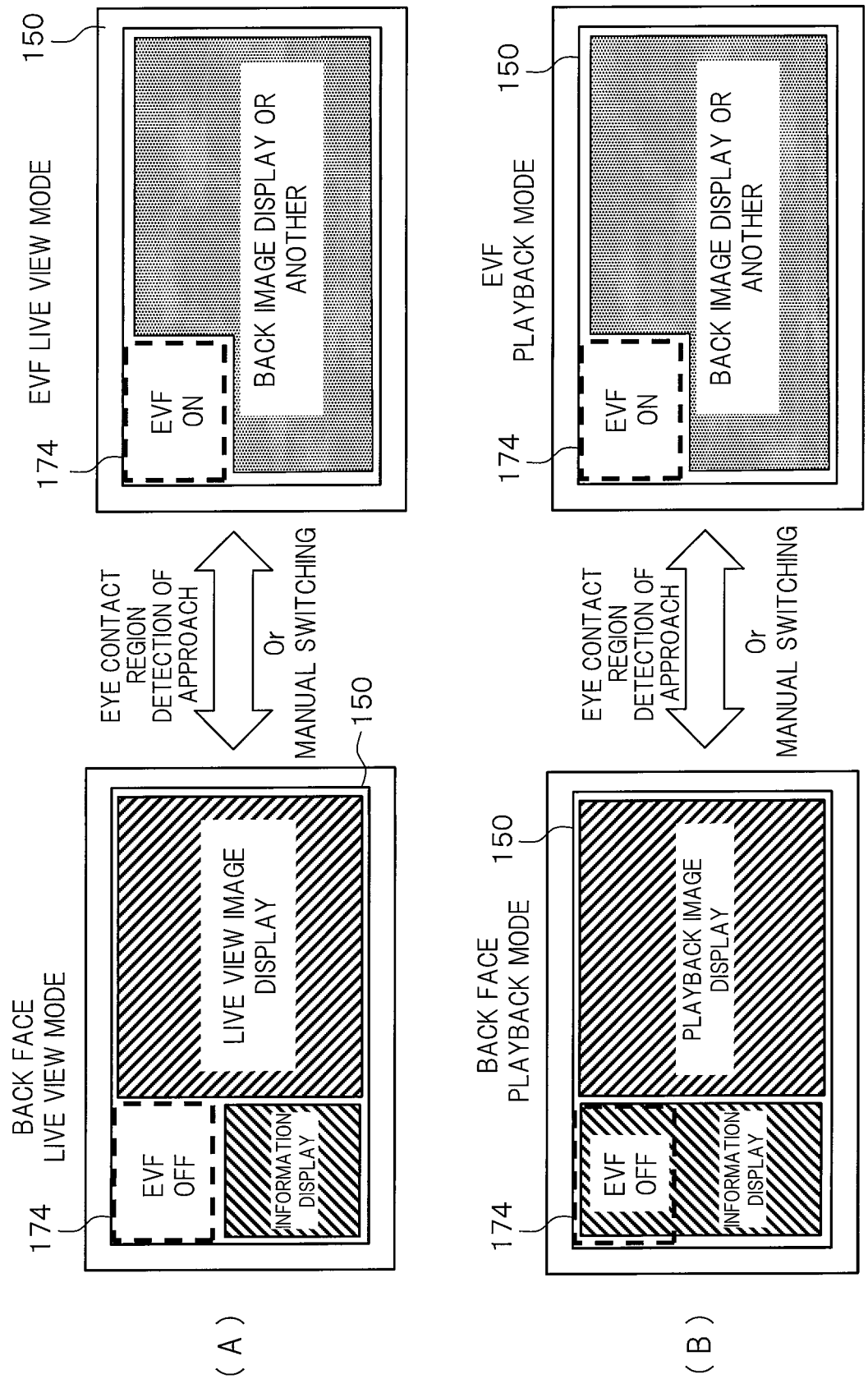
FIG. 8 is a view showing contents displayed as one example on the display device in a back face display mode and an EVF display mode according to the first embodiment of the present invention.
Figure 9:
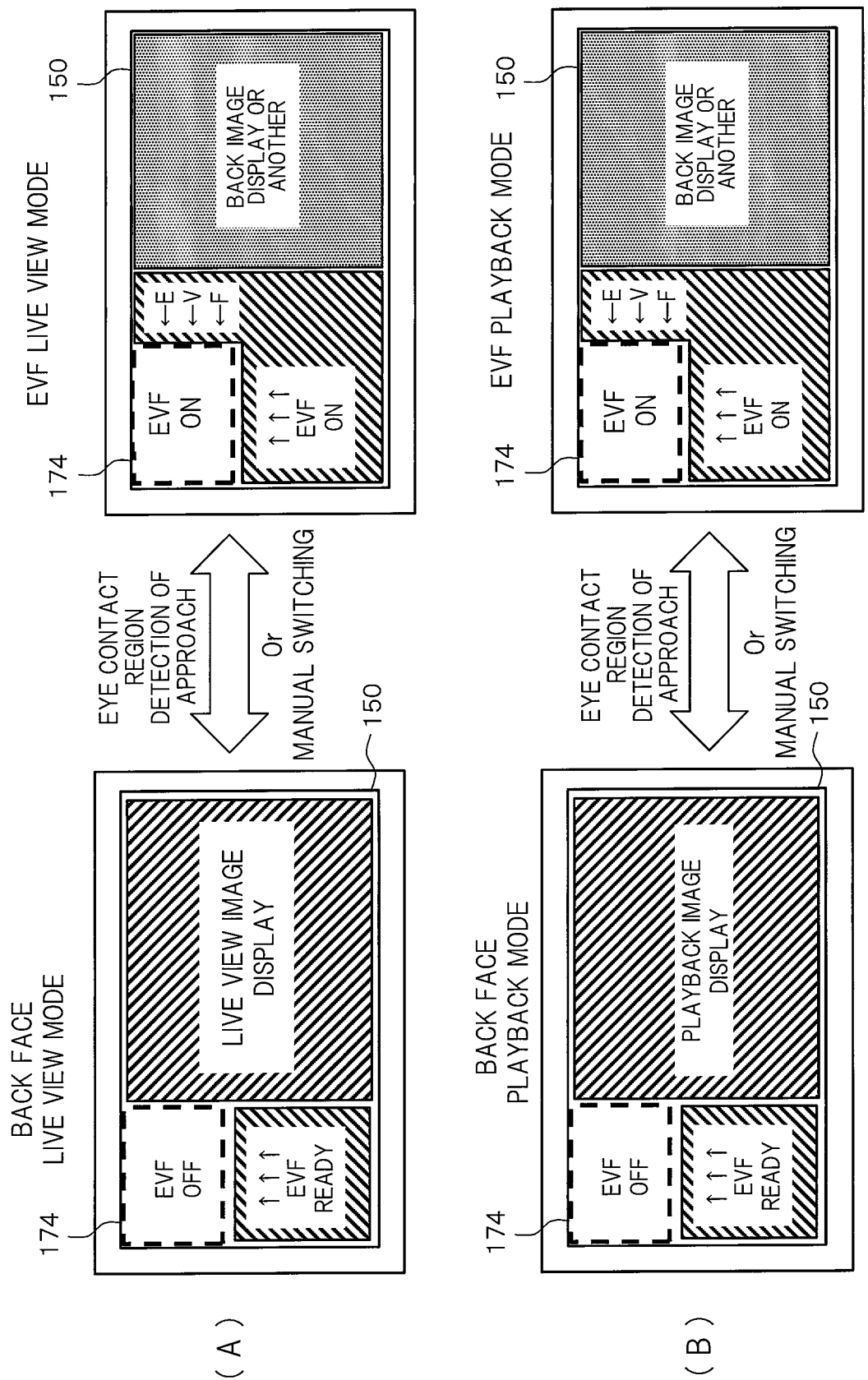
FIG. 9 is a view showing contents displayed as one example on the display device in a back face display mode and an EVF display mode according to the first embodiment of the present invention.

FIGS. 7 to 9 are views each showing contents displayed as one example on a display device in a back face display mode and an EVF display mode according to the first embodiment of the present invention. The controller 110 is configured to perform a switching operation between a back face display mode (a first display mode) for displaying a live view image or a playback image on the display device 150 and an EVF display mode (a second display mode) for displaying a live view image or a playback image on the EVF 170.

For example, the controller 110 is configured to perform a switching operation to take the back face display mode in which the display device 150 is turned on and the EVF 170 is turned off. Specifically, when the operation button 123c or the like is operated to select the back face display mode, the controller 110 turns on the display device 150 and turns off the EVF display element 171. The back face display mode is composed of a back face live view mode and a back face playback mode.

It is to be noted that when the display device requiring the backlight is used for the display device 150 shown in FIGS. 2 and 4, the controller 110 turns on the first backlight 155 and the second backlight 156 in the back face display mode (the first display mode).

It is to be noted that the term "turn off the EVF display element 171" also includes a case where the controller 110 turns off electricity to the EVF display element 171 and a case where the controller 110 stops the EVF display element 171 from displaying an image and prevents the EVF display element 171 from emitting light with the EVF display element 171 electrified.

The back face live view mode means a mode making the display device 150 display a live view image of the subject. Specifically, the controller 110 is configured to make the captured image generator 103 sequentially output an electric signal for each pixel to the imaging element 102. The controller 110 is configured to make the captured image generator 103 generate images of the subject sequentially. Then, the controller 110 is configured to make the captured image generator 103 output the generated images to the display device 150 sequentially. In this manner, for example, as shown in FIG. 7A, the controller 110 is configured to make the display device 150 display a live view image of the subject. It is to be noted that during this period, the controller 110 keeps turning off the EVF display element 171 so that the live view image or the like cannot be displayed on the EVF display element 171, for example, as shown in FIG. 7A.

On the other hand, the back face playback mode means a mode displaying an image (a still image or a moving image) captured by the imaging apparatus 100 and recorded in the storage 125 on the display device 150. Specifically, the controller 110 is configured to make the display device 150 display the image selection menu for a user to select the captured image. The controller 110 reads out the image selected by the user from the storage 125 to output the same to the display device 150. In this manner, for example, as shown in FIG. 7B, the controller 110 is configured to make the display device 150 display a playback image. It is to be noted that, also in the back face playback mode, the controller 110 keeps the EVF 170 turned off so that an image cannot be displayed on the EVF display element 171, for example, as shown in FIG. 7B.

In the back face display mode, the controller 110 may be configured to make the display device 150 display information on the image displayed on the display device 150. For example, as shown in FIGS. 8A and 8B, the controller 110 is configured to make the display device 150 display the image on the display device 150 on the same side as the first side face 190c of the main body 190 from the EVF eyepiece part 174. Furthermore, the controller 110 is configured to make the display device 150 display the image information on the display device 150 on the same side as the bottom face 190f of the main body 190 from the EVF eyepiece part 174.

In other words, the controller 110 is configured to make the display device 150 display the live view image or the playback image in a region on the same side as the first side face 190c from the EVF eyepiece part 174 and display the information on the live view image or the playback image in a region below the EVF eyepiece part 174. In addition, the controller 110 may be configured to make the display device 150 display the information of the live view image or the playback image displayed on the display device 150, for example, in an overlapping manner with the live view image or the playback image. At this time, it is preferable that, for example, the controller 110 is configured to make the display device 150 display the information near an edge of the live view image or the playback image on an end portion of the live view image or the playback image so as not to impair visibility of the live view image or the playback image.

Furthermore, in the back face display mode, the controller 110 may display an image, indicating that the EVF 170 is available, on a region adjacent to the EVF eyepiece part 174 in display device 150.

For example, as shown in FIGS. 9A and 9B, the controller 110 may be configured to make display an image, indicating that the EVF 170 is available (for example, a display of "EVF READY" or the like), on a region surrounding the EVF eyepiece part 174 from the bottom face 190f to the first side face 190c of the main body 190, in the display device 150.

<EVF Display Mode>

In addition, the controller 110 is configured to perform the switching operation to take the EVF display mode causing the display device 150 corresponding to the EVF eyepiece part 174 to be turned off when causing the EVF 170 to be turned on. Specifically, when the operation button 123c or the like is operated to select the EVF display mode, the controller 110 turns on the EVF display element 171 and turns off display on the EVF eyepiece part 174 in the display region of the display device 150. The EVF display mode is composed of the EVF live view mode and the EVF playback mode.

It is to be noted that when the display device apparatus requiring the backlight is used for the display device 150 shown in FIGS. 2 and 4, the controller 110 turns off both the first backlight 155 and the second backlight 156 in the EVF display mode (the second display mode).

It is to be noted that the expression "turning off the EVF eyepiece part 174 in the display region of the display device 150" also includes a case where the controller 110 turns off electricity to the portion of the display device 150 corresponding to the EVF eyepiece part 174 or a case where the controller 110 stops the display device 150 of the EVF eyepiece part 174 from displaying the image and prevents the portion of the display device 150 corresponding to the EVF eyepiece part 174 from emitting light with the display device 150 of the EVF eyepiece part 174 electrified.

The term "EVF live view mode" means making the EVF 170 display a live view image of the subject to the EVF 170. Specifically, the controller 110 is configured to make the imaging element 102 output an electric signal for each pixel to the captured image generator 103 sequentially. Furthermore, the controller 110 is configured to make the captured image generator 103 generate images of the subject sequentially. Then, the controller 110 makes the captured image generator 103 output the generated images to the EVF display element 171 of the EVF 170 sequentially and makes the EVF display element 171 display the images. In this manner, for example, as shown in FIG. 7A, the controller 110 makes the EVF 170 display a live view image of the subject. It is to be noted that during this period, the controller 110 keeps the state of turning off a portion of the display device 150 corresponding to the EVF eyepiece part 174 turned off so that a live view image or the like cannot be displayed on the portion of the display device 150 corresponding to the EVF eyepiece part 174, for example, as shown in FIG. 7A.

On the other hand, the term "EVF playback mode" means displaying an image (a still image or a moving image) imaged by the imaging apparatus 100 and recorded in the storage 125 on the EVF 170. Specifically, the controller 110 is configured to make the EVF display element 171 display the image selection menu for a user to select the captured image. The controller 110 is configured to read out the image selected by the user from the storage 125, to output the same to the EVF display element 171, and to make the EVF display element 171 display a playback image. In this manner, for example, as shown in FIG. 7B, the controller 110 is configured to make the EVF 170 display the playback image. It is to be noted that, for example, as shown in FIG. 7B, also in the EVF playback mode, the controller 110 keeps a portion of the display device 150 corresponding to the EVF eyepiece part 174 turned off so that an image cannot be displayed on the portion of the display device 150 corresponding to the EVF eyepiece part 174.

In the EVF display mode such as the EVF live view mode or the EVF playback mode, for example, as shown in FIGS. 7A, 7B, 8A, and 8B, the controller 110 may be configured to make the display device 150 display black image on the display region of the display device 150 excluding the EVF eyepiece part 174. Thereby, light emission of the display device 150 is suppressed so that a reduction in visibility of display content on the EVF display element 171 due to unnecessary light entering the eye of the user in contact with the EVF eyepiece part 174 can be prevented.

Furthermore, in the EVF display mode, the controller 110 may be configured to make the display device 150 display an image indicating that the EVF 170 is turned on in a region adjacent to the EVF eyepiece part 174 of the display region of the display device 150.

For example, as shown in FIGS. 9A and 9B, the controller 110 is configured to make the display device 150 display an image indicating that the EVF 170 is on the display device 150 surrounding the EVF eyepiece part 174 from on the same side as the bottom face 190*f* to on the same side as the first side face 190*c* of the main body 190. Furthermore, as shown in FIGS. 9A and 9B, the controller 110 may be configured to make a region of the display device 150 excluding these to display a black display.

FIG. 10 is a view showing one example of an image displayed on an EVF according to a first embodiment. In the EVF display mode, the controller 110 may be configured to make the EVF 170 display information on an image (a live view image or a playback image) displayed on the EVF 170. For example, the controller 110 may be configured to make the EVF display element 171 to display an image and information on the image on the same screen individually, for example, as shown in FIG. 10A. Furthermore, the controller 110 may be configured to make the EVF display element 171 display the image and the information on the image in an overlapping manner, for example, as shown in FIG. 10B. Furthermore, the controller 110 may be configured to make the EVF display element 171 display setting information of the imaging apparatus 100, a menu, or the like, in addition to the information on the image.

When the controller 110 performs display mode switching according to the operation of the operation button 123*c* or the like, for example, as shown in FIGS. 7A, 8A, and 9A, the controller 110 performs switching between the back face live view mode and the EVF live view mode mutually, and, for example, as shown in FIGS. 7B, 8B, and 9B, the controller 110 performs switching between the back face playback mode and the EVF playback mode mutually. In addition, besides these switching, the controller 110 may perform switching between the back face live view mode and the EVF playback mode mutually, and perform switching between the back face playback mode or the EVF live view mode mutually.

<Automatic Switching of Display Mode>

Although the display mode is manually switched in the case example described above, the display mode may be automatically switched.

FIG. 11 is a table showing comparison between states of each of the parts in the back face display mode and the EVF display mode. When the eye contact detection sensor 131 does not detect eye contact of the user, for example, as shown in FIG. 11, the controller 110 performs a switching operation to take the back face display mode whereby the display device 150 is turned on and the EVF 170 is turned off. At this time, when the display device 150 is a display device of the type requiring a backlight, the controller 110 turns on both the first backlight 155 and the second backlight 156.

Furthermore, when the eye contact detection sensor 131 detects eye contact of the user, for example, as shown in FIG. 11, the controller 110 performs a switching operation to take the EVF display mode whereby a portion of the display device 150 corresponding to the EVF eyepiece part 174 is turned off and the EVF 170 is turned on. At this time, when the display device 150 is the display device of a type requiring a backlight, the controller 110 turns off both the first backlight 155 and the second backlight 156.

In this manner, the controller 110 performs switching between the back face display mode and the EVF display mode alternately on the basis of the detection result of the eye contact of the user obtained by the eye contact detection sensor 131. Specifically, for example, as shown in FIGS. 7A, 8A, and 9A, the controller 110 performs switching between the back face live view mode and the EVF live view mode mutually. Furthermore, for example, as shown in FIGS. 7B, 8B, and 9B, the controller 110 performs switching between the back face playback mode and the EVF playback mode mutually. In addition, also when switching of the display mode is performed automatically, the controller 110 may perform switching between the back face live view mode and the EVF playback mode mutually, or may perform switching between the back face playback mode and the EVF live view mode mutually.

<Advantageous Effect According to this Embodiment>

According to this embodiment, the EVF eyepiece part 174 of the EVF 170 is provided to the display device 150.

According to this configuration, since it is unnecessary to provide the EVF eyepiece part 174 and the display device 150 individually, a tradeoff between a region size of the EVF eyepiece part 174 and a region size of the display device 150 is eliminated. Specifically, as long as securing a region for the display device 150 is secured on the back face 190b of the main body 190, it is unnecessary to secure an installation space for the EVF eyepiece part 174 separately. Thereby, the imaging apparatus 100 having the display device 150 and the EVF eyepiece part 174 arranged in a more preferred manner on the back face 190b of the main body 190 is provided.

Furthermore, according to this embodiment, the back face light-blocking mask 175 is provided between the display device 150 excluding the EVF eyepiece part 174 and the main body 190.

According to this configuration, since light transmitted through the display device 150 is shielded in a region excluding the EVF eyepiece part 174 by the back face light-blocking mask 175, diffused reflection of the transmitted-through light is suppressed. Thereby, the imaging apparatus 100 where a reduction in contrast of the display device 150 is suppressed so that visibility of the live view image or the like displayed on the display device 150 can be improved is provided.

In addition, according to this embodiment, the EVF optical system 172 is arranged behind the region of the EVF eyepiece part 174 provided to the region having transmissivity of the display device 150 as viewed from the outside of the main body 190.

According to this configuration, since a distance between the EVF display element 171 and the EVF eyepiece part 174 is reduced, the EVF 170 can be suppressed in size. Thereby, the imaging apparatus 100 is provided with the EVF 170 suppressed in size.

Furthermore, according to this embodiment, the display device 150 is configured to have a horizontally long rectangular shape and the imaging button 123a is provided on the upper face 190e of the main body 190 on the same side as the first side face 190c of the main body 190. And the EVF eyepiece part 174 is provided to the display device 150 on the same side as the second side face 190d of the main body 190 and on the same side as the upper face 190e of the main body 190.

According to this configuration, regardless of whether the imaging apparatus 100 is used in the horizontal position or in the vertical position, the hand of the user operating the imaging button 123a and the face of the user peeping through the EVF eyepiece part 174 do not cross each other, so that the imaging apparatus 100 having excellent maneuverability is provided.

Furthermore, according to this embodiment, the EVF 170 has a light-blocking effect excluding the EVF eyepiece part 174 thereof. That is, the EVF optical system 172 and the EVF display element 171 are arranged in a space having a light-blocking effect excluding the EVF eyepiece part 174.

According to this configuration, since light transmitted through the EVF eyepiece part 174 is shielded by the EVF darkroom 173, the light is prevented from entering the main body 190 via the EVF 170. Thereby, a high-quality captured image with reduced noise is generated. Furthermore, according to this embodiment, since the inside of the EVF 170 can be put into a darkroom environment during the eye contact, the imaging apparatus 100 where a reduction in contrast in the EVF eyepiece part 174 is suppressed so that visibility of an image or the like in the EVF 170 can be improved is provided.

Furthermore, according to this embodiment, the controller 110 performs switching to the back face display mode where the EVF 170 is turned off when the display device 150 is turned on.

According to this configuration, since the display of an image or the like performed by the display device 150 and the display of an image or the like performed by the EVF 170 do not overlap with each other on the EVF eyepiece part 174 in the back face display mode, the imaging apparatus 100 where display quality of the display device 150 is improved is provided.

Furthermore, according to this embodiment, the controller 110 is configured to make the display device 150 display information on an image displayed on the display device 150 in the back face display mode.

According to this configuration, since the information on the image is recognized by the user, the imaging apparatus 100 excellent in convenience is provided.

Furthermore, according to this embodiment, when the display device 150 is a display device of the type requiring a backlight, the first backlight 155 is provided between the display device 150 excluding the EVF eyepiece part 174 and the main body 190, and the second backlight 156 is provided within the EVF 170.

According to this configuration, lack of the backlight only in the EVF eyepiece part 174 of the display device 150 in the back face display mode is prevented.

Furthermore, according to this embodiment, the display device 150 is composed of an organic EL element constituting a display device of a self light emitting type.

According to this configuration, since the backlight can be removed, the display device 150 reduced in weight and thinned is provided. Thereby, the imaging apparatus 100 reduced in weight and thinned is provided.

Furthermore, according to this embodiment, the controller 110 performs a switching operation to take the EVF display mode turning off the display device 150 of the EVF eyepiece part 174 when the EVF 170 is turned on.

According to this configuration, since a display of an image or the like performed by the EVF and a display of an image or the like performed by the display device 150 do not overlap with each other in the EVF eyepiece part 174 in the EVF display mode, the imaging apparatus 100 improved in display quality of the EVF 170 is provided.

Furthermore, according to this embodiment, the controller 110 is configured to make the display device 150 excluding the EVF eyepiece part 174 display a black display in the EVF display mode.

According to this configuration, the imaging apparatus 100 where a reduction in contrast of a display content of the EVF 170 due to unnecessary light entering the eye of the user in contact with the EVF eyepiece part 174 is further suppressed is provided.

Furthermore, according to this embodiment, in the EVF display mode, the controller 110 is configured to display an image indicating that the EVF 170 is "on" in the display device 150 in a region adjacent to the EVF eyepiece part 174.

According to this configuration, since a current display mode is recognized by a user, the imaging apparatus 100 excellent in convenience is provided.

Furthermore, according to this embodiment, the controller 110 is configured to make the EVF 170 display information on an image displayed on the EVF 170 in the EVF display mode.

According to this configuration, since a user can acquire the information on the image without looking away from the EVF eyepiece part 174, the imaging apparatus 100 excellent in convenience is provided.

Furthermore, according to this embodiment, when the display device 150 is a display device of the type requiring a backlight, the first backlight 155 is provided between the display device 150 excluding the EVF eyepiece part 174 and the main body 190, the second backlight 156 is provided within the EVF 170, and the second backlight 156 within the EVF 170 is turned off in the EVF display mode.

According to this configuration, the imaging apparatus 100 where a reduction in contrast of a display content of the EVF 170 is further suppressed in the EVF display mode is provided.

Furthermore, according to this embodiment, unless the eye contact detection sensor 131 had detected the eye contact of the user, the controller 110 performs a switching operation to take the back face display mode where the display device 150 turned on and the EVF 170 is turned off.

According to this configuration, since a switching operation to take the back face display mode is performed automatically as long as the user looks away from the EVF eyepiece part 174, it is not necessary for the user to manually operate and switch the display mode of the imaging apparatus 100, thereby providing excellent convenience.

Furthermore, according to this embodiment, when the eye contact detection sensor 131 detects the eye contact of the user, the controller 110 performs a switching operation to take the EVF display mode where the display device 150 of the EVF eyepiece part 174 is turned off and the EVF 170 is turned on.

According to this configuration, since a switching operation to take the EVF display mode is performed automatically as long as the user looks into the EVF eyepiece part 174, it is not necessary for the user to manually operate and switch the display mode of the imaging apparatus 100, thereby providing excellent convenience.

Second Embodiment

Figure 12:
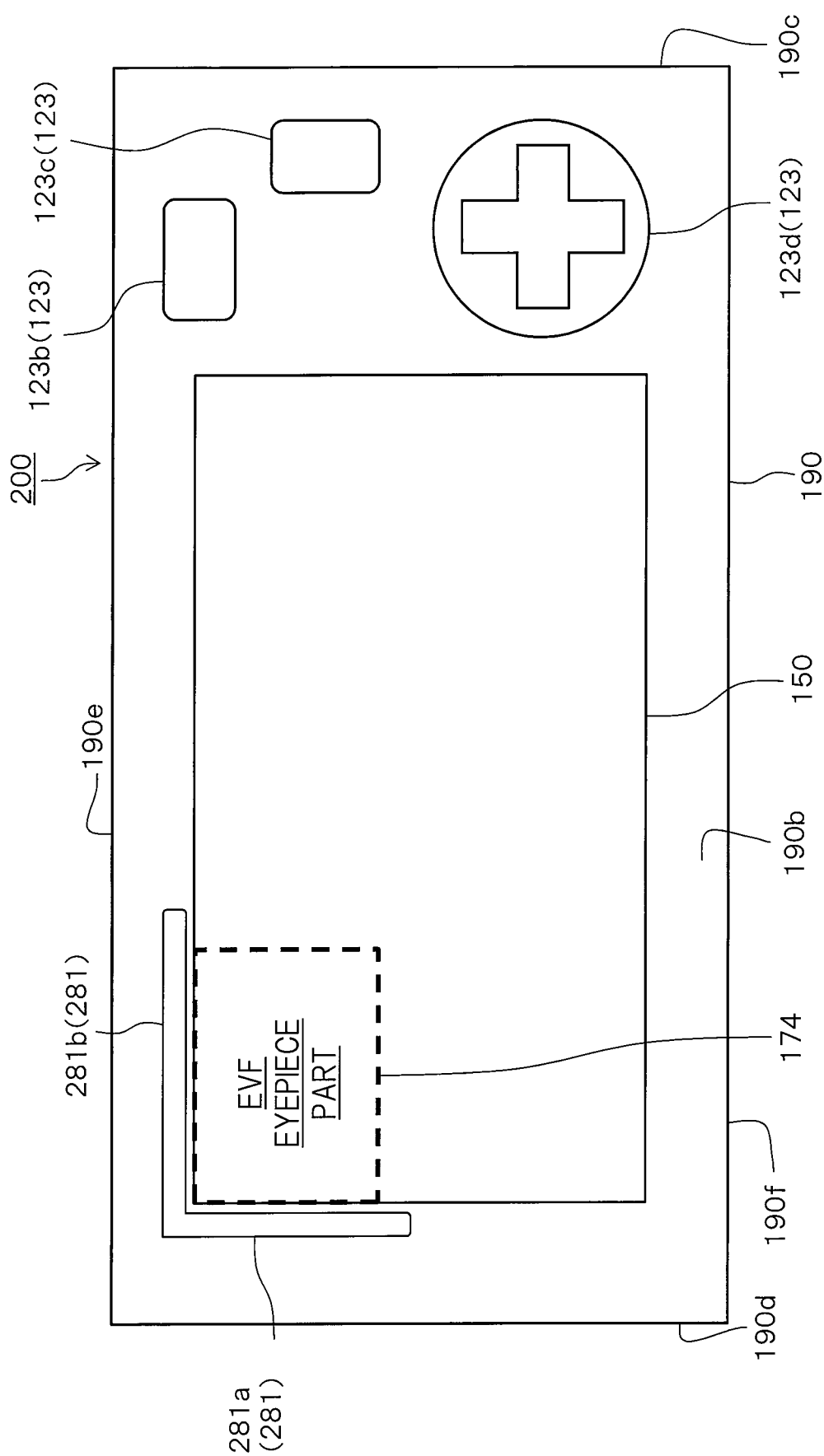
FIG. 12 is a rear view showing one example of the configuration of an imaging apparatus according to the second embodiment of the present invention.

In the following embodiment, the imaging apparatus is provided with a light-blocking member disposed adjacent to the display device 150. FIG. 12 is a rear view showing one example of the configuration of the imaging apparatus according to the second embodiment of the present invention.

For example, as shown in FIG. 12, an imaging apparatus 200 according to this embodiment is provided with a light-blocking member 281. Specifically, the light-blocking member 281 configured to suppress entry of light into the EVF eyepiece part 174 from between the EVF eyepiece part 174 and the face of the user during eye contact of the user is provided on the back face 190*b* of the main body 190 around the display device 150.

For example, as shown in FIG. 12, the light-blocking member 281 is provided on the same side as the second side face 190*d* of the main body 190 and on the same side as the upper face side 190*e* of the main body 190 with respect to the display device 150. For example, as shown in FIG. 12, the light-blocking member 281 is composed of a light-blocking member 281*a* and a light-blocking member 281*b*. As shown in FIG. 12, the light-blocking member 281*a* is provided on the same side as the second side face 190*d* of the main body 190 so as to extend along short-side direction (in a vertical direction) of the display device 150. On the other hand, the light-blocking member 281*b* is provided on the same side as the upper face 190*e* of the main body 190 so as to extend in a longitudinal direction (in a horizontal direction) of the display device 150. Thereby, as shown in FIG. 5, when the user uses the imaging apparatus in the horizontal position, it is possible to suppress entry of light from the upper face 190*e* of the main body 190 or the side of the second side face 190*d* of the main body 190, these sides having high possibility of sunlight pouring. The light-blocking member 281 (281*a*, 281*b*) is made from resin having light-blocking effect or the like, for example.

It is to be noted that, for example, as shown in FIG. 12, the light-blocking members 281*a*, 281*b* are provided on the same side as the second side face 190*d* and on the same side as the upper face 190*e* of the EVF eyepiece part 174, but besides this, it is preferred that a light-blocking member is provided around the EVF eyepiece part 174 as far as possible.

Figure 13:
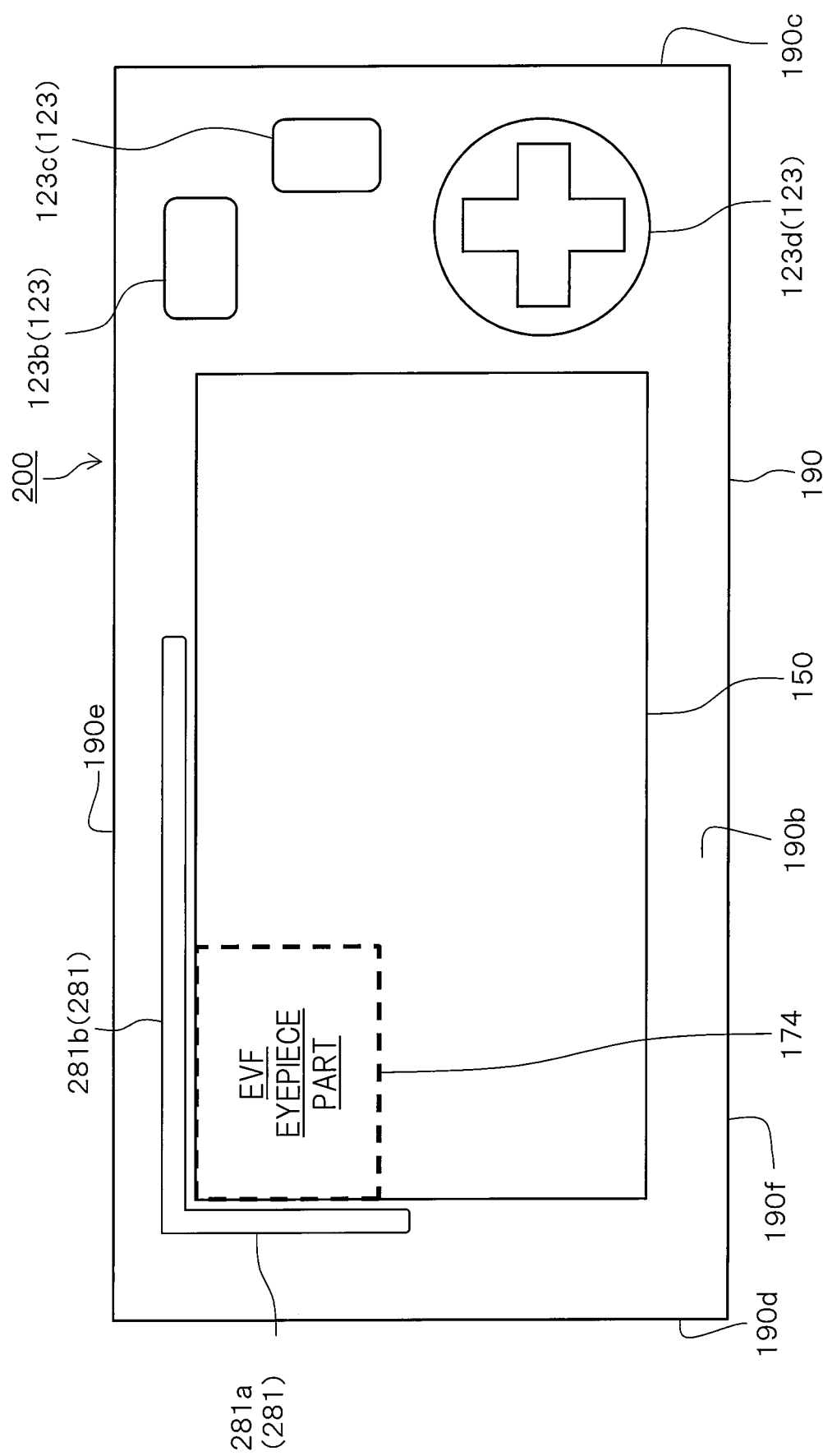
FIG. 13 is a rear view showing one example of the configuration of the imaging apparatus according to the second embodiment of the present invention.

FIG. 13 is a view showing an example of another configuration of the imaging apparatus according to the second embodiment of the present invention. For example, as shown in FIG. 13, the light-blocking member 281 is preferably configured so that a length of the light-blocking member 281 on the same side as the upper face 190*e* of the main body 190 is two or more times longer than the EVF eyepiece part 174 in a longitudinal direction of the display device 150. That is, the light-blocking member 281 is configured so that the length thereof in the horizontal direction is two or more times longer the EVF eyepiece part 174 in the horizontal direction. In this manner, the light-blocking member 281*b* is preferably configured so that the length thereof in the horizontal direction is sufficiently longer in width than the EVF eyepiece part 174 in the horizontal direction. Thereby, as shown in FIG. 5, when the user uses the imaging apparatus in the horizontal position, a possible entry angle of light from the upper face 190*e* of the main body 190 having high possibility of sunlight pouring can be narrowed as much as possible. Furthermore, for example, as shown in FIG. 6, when a user uses the imaging apparatus in the vertical position, the possible entry angle of light from the first side face 190*c* of the main body 190 having high possibility of sunlight pouring can be narrowed as much as possible.

Figure 14:
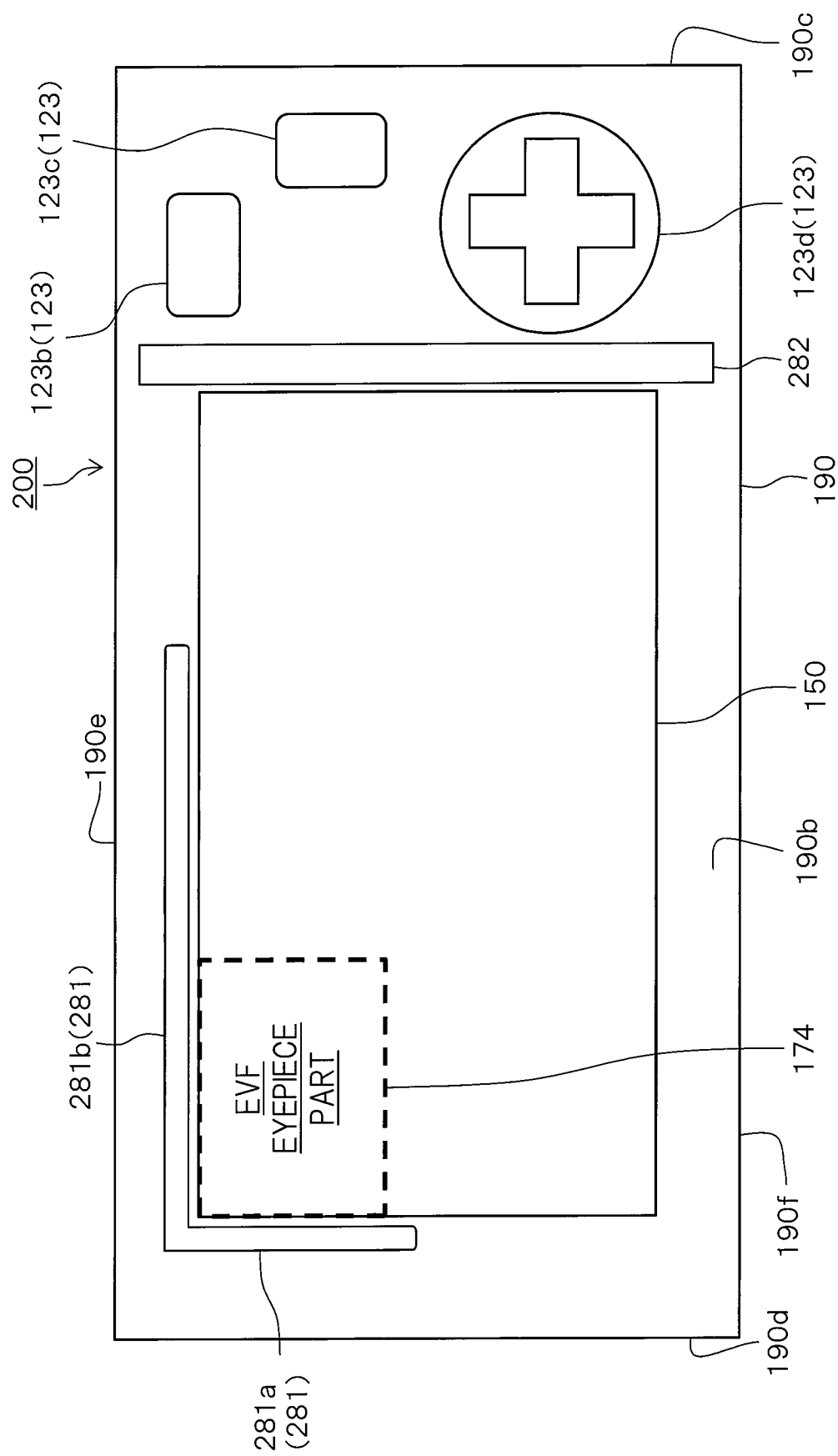
FIG. 14 is a rear view showing one example of another configuration of the imaging apparatus according to the second embodiment of the present invention.

FIG. 14 is a rear view of an example of another configuration of the imaging apparatus according to the second embodiment of the present invention. In the imaging apparatus 200 in this embodiment, a light-blocking member 282 may be provided on the same side as the first side face 190*c* of the main body 190 with respect to the display device 150. Thereby, for example, as shown in FIG. 6, when the user uses the imaging apparatus in the vertical position, light from the first side face 190*c* of the main body 190 having high possibility of sunlight pouring can be further prevented. As shown in FIG. 14, the light-blocking member 282 extends along a short-side direction (in the vertical direction) of the display device 150.

<Advantageous Effect of this Embodiment>

According to this embodiment, in addition to effects of the above-mentioned embodiment, it is possible to obtain the following effects. According to this embodiment, the light-blocking member 281 is disposed adjacent to the display device 190.

According to this configuration, since light incident on the EVF eyepiece part 174 from between the EVF eyepiece part 174 and the face of the user during eye contact of the user is reduced, the imaging apparatus 200 is suppressed in reduction of contrast in the EVF 170 and improved in visibility of the EVF 170.

Furthermore, according to this embodiment, the light-blocking member 281 is provided on the same side as the second side face 190d of the main body 190 and on the same side as the upper face 190e thereof with respect to the display device 150. Furthermore, the light-blocking member 281 extends along the short-side direction of the display device 150 on the same side as the second side face 190d of the main body 190, and extends along the longitudinal direction of the display device 150 on the same side as the upper face 190e of the main body 190.

According to this configuration, since the light-blocking member 281 is consequently provided to the vicinity of the EVF eyepiece part 174, entry of light into the EVF eyepiece part 174 is further suppressed. Thereby, the imaging apparatus 200 is further suppressed in reduction of contrast in the EVF 170 and further improved in visibility of the EVF 170.

Furthermore, according to this embodiment, the light-blocking member 281 is configured so that the length thereof on the same side as the upper face 190e of the main body 190 is two or more times longer than the EVF eyepiece part 174 in the longitudinal direction of the display device 150.

According to this configuration, since entry of light into the display device 150 from obliquely upper side of the display device 150 on the side of the first side face 190c is suppressed, the imaging apparatus 200 is further suppressed in reduction of contrast in the EVF 170 and further improved in visibility of the EVF 170.

Furthermore, according to this embodiment, the light-blocking member 282 is provided on the same side as the first side face 190c of the main body 190 with respect to the display device 150 and extends in the short-side direction of the display device 150.

According to this configuration, since entry of light from a lateral direction of the display device 150 is suppressed, the imaging apparatus 200 is further improved in visibility of the EVF 170. Furthermore, according to this configuration, when the imaging apparatus 200 is used in the vertical position, since entry of light into the display device 150 from above is suppressed, the imaging apparatus 200 is suppressed in reduction of contrast in the EVF 170 and improved in visibility of the EVF 170.

Third Embodiment

In this embodiment, an example where a touch sensor 180 is provided to the display device 150 so that the display device 150 can function as a touch panel having the advantageous effect of the imaging apparatus of the first embodiment is described. It is to be noted in the following description that a direction described as "as viewed from a user" refers to a direction shown as "a direction viewed from a user" in respective figures. In this case, since the [direction viewed from a user] is a direction viewed from the side of the back face 190b of the main body 190, left and right directions of the [direction viewed from a user] in a horizontal position shooting are reversed from left and right regarding directions viewed from the side of the front face 190a of the main body 190.

<Configuration of Imaging Apparatus>

Figure 15:
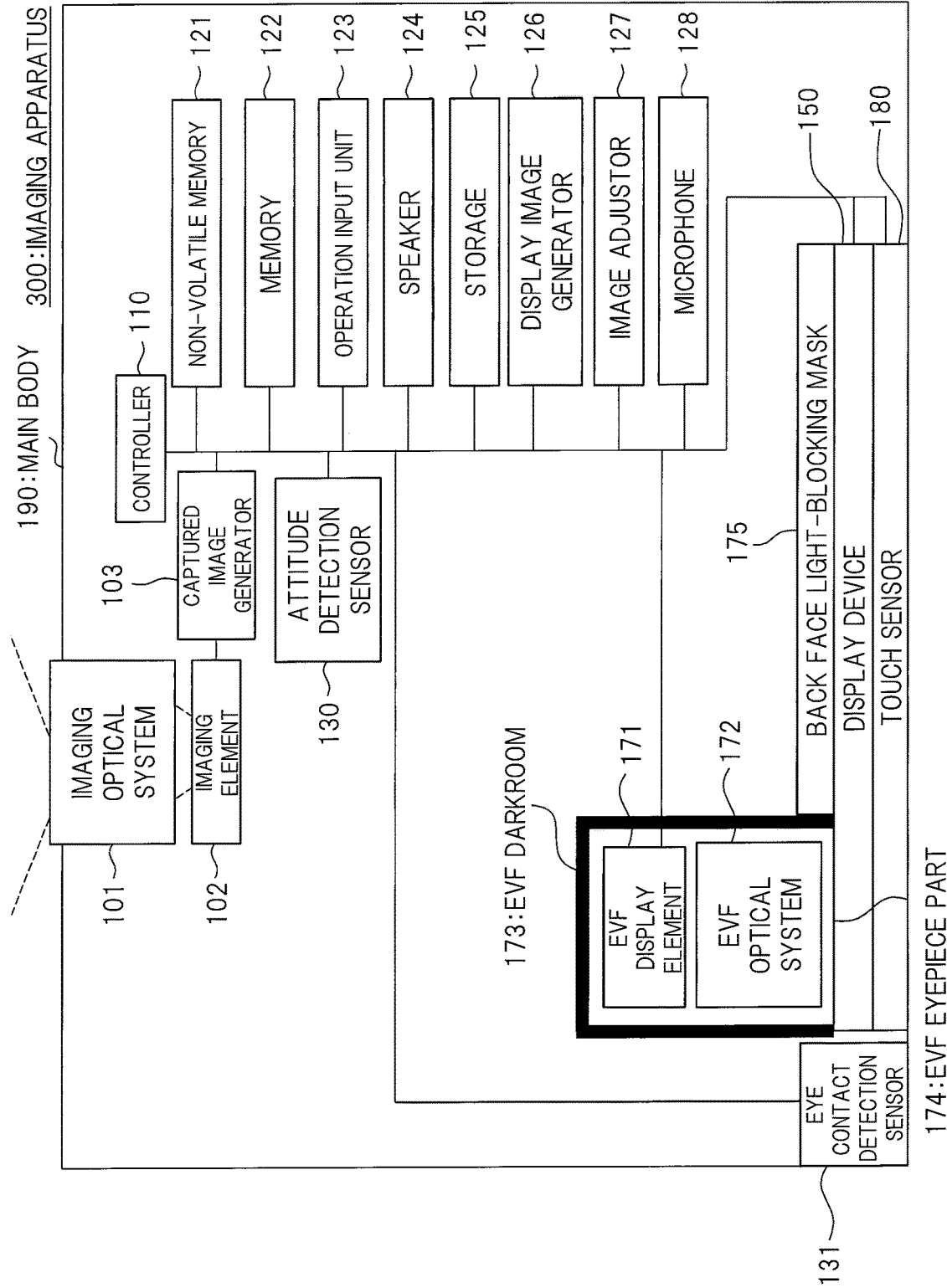
FIG. 15 is a view showing one example of the configuration of an imaging apparatus according to the third embodiment of the present invention.
Figure 16:
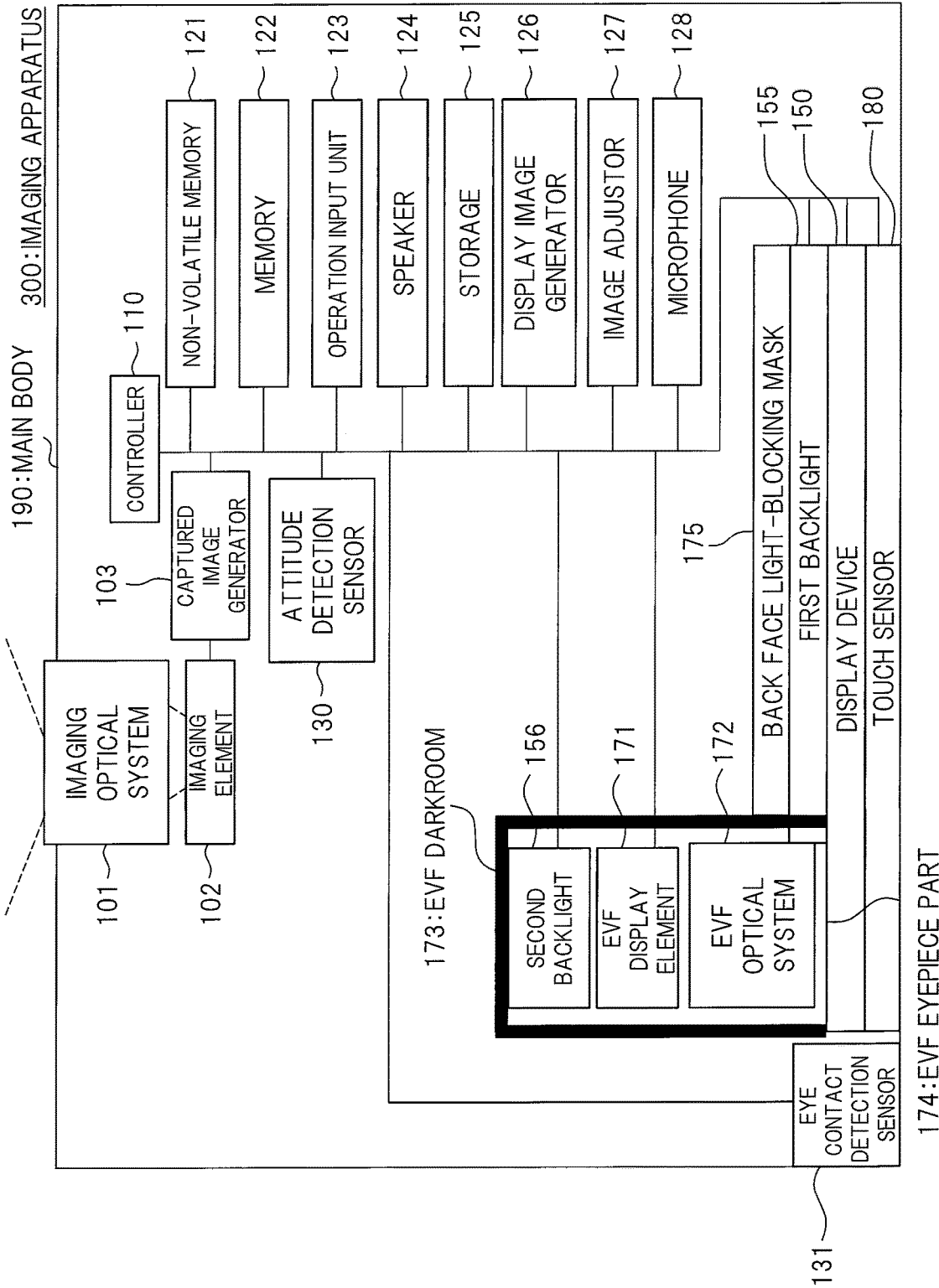
FIG. 16 is a view showing one example of the configuration of the imaging apparatus according to the third embodiment of the present invention.

FIGS. 15 and 16 are views each showing one example of the configuration of an imaging apparatus according to the third embodiment of the present invention.

An imaging apparatus 300 shown in FIG. 15 is configured by providing a transparent touch sensor 180 in a front of the display device 150 and further providing an eye contact detection sensor 132 having a configuration different from that shown in FIG. 1 in the imaging apparatus 100 shown in FIG. 1. Since the other configurations and actions are similar to those of the imaging apparatus 100 shown in FIG. 1 of the first embodiment, the descriptions thereof are omitted. The imaging apparatus 300 shown in FIG. 16 is configured by providing the transparent touch sensor 180 in front of the display device 150 and further providing the eye contact detection sensor 132 having a configuration different from that shown in FIG. 1 in the imaging apparatus 100 shown in FIG. 2. Since the other configurations and actions are similar to those of the imaging apparatus 100 shown in FIG. 1 of the first embodiment, the descriptions thereof are omitted.

In both the imaging apparatuses 300 shown in FIGS. 15 and 16, the touch sensor 180 is composed of a sensor such as an electrostatic capacitance type sensor, a resistive film type sensor, or an ultrasonic surface acoustic wave type sensor, and detects contact of a finger of the user to a touch sensor surface, a position of the contact, and the like. The controller 110 controls each function of the imaging apparatus 300 on the basis of the detection result of the touch sensor 180.

<Manual Switching Between Back Face Display Mode and EVF Display Mode>

In this embodiment, regarding the manual switching between the back face display mode and the EVF display mode, an action similar to that of the imaging apparatus of the first embodiment is performed, and the description thereof is omitted.

<Automatic Switching Between Back Face Display Mode and EVF Display Mode>

The imaging apparatus 300 of this embodiment is provided with the eye contact detection sensor 132 different from the eye contact detection sensor 131 of the imaging apparatus of the first embodiment. The automatic switching between the back face display mode and the EVF display mode is performed using the detection result of the eye contact detection sensor 132, and therefore an action different from that of the first embodiment is performed. A configuration example of the eye contact detection sensor 132 and an action example of the imaging apparatus 300 on the basis of the detection result of the eye contact detection sensor 132 are described below.

<Configuration Example of EVF Contact Detection Sensor 132>

FIGS. 17 to 24 are explanation views each related to the configuration of the eye contact detection sensor according to the third embodiment of the present invention.

Figure 17:
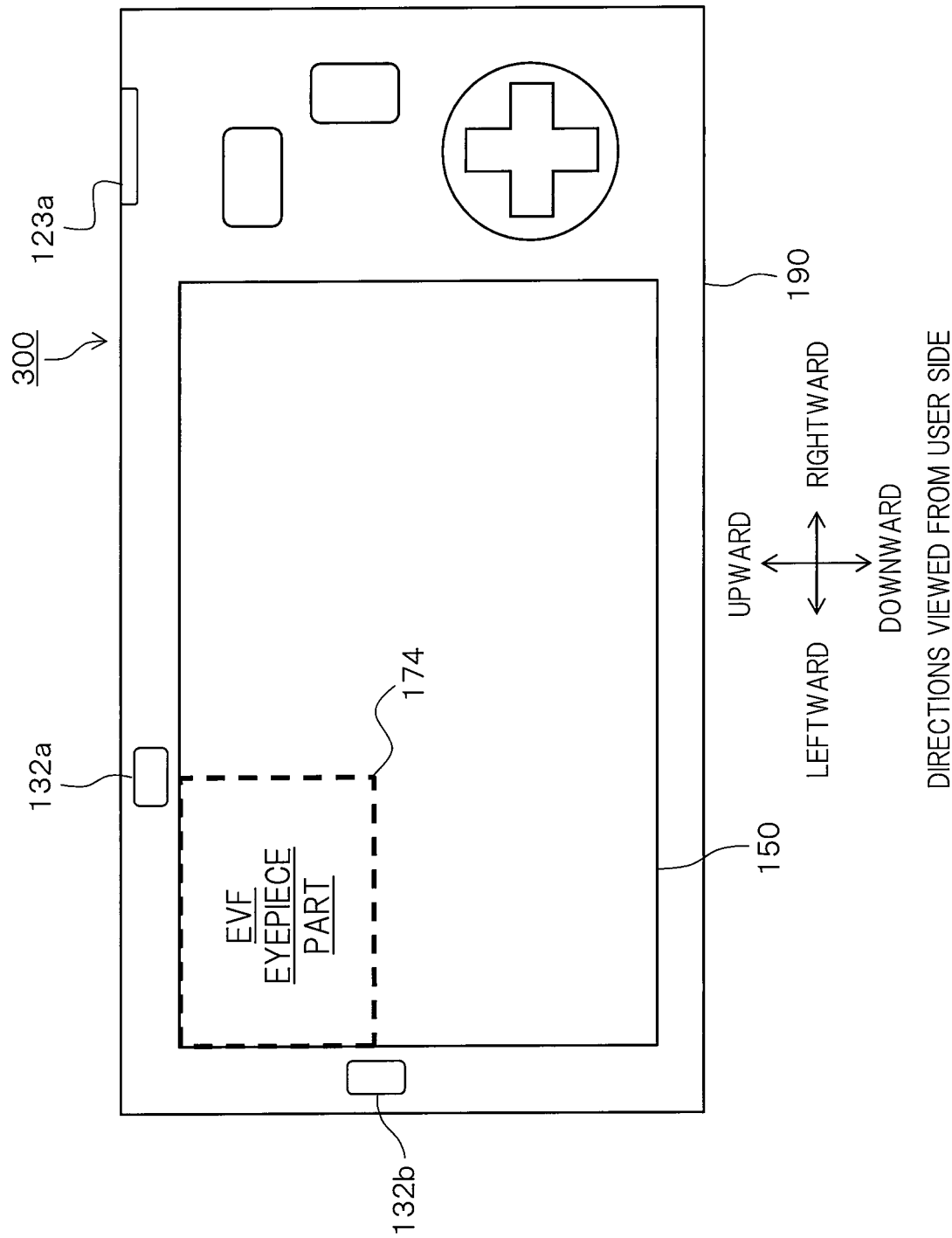
FIG. 17 is an explanation view related to the configuration of the imaging apparatus according to the third embodiment of the present invention.

FIG. 17 is a view showing one example of the configuration of the eye contact detection sensor 132 according to the third embodiment of the present invention. As described in the first embodiment of the present invention, the imaging button 123a is provided on the upper face 190e of the main body 190 on the same side as the first side face 190c of the main body 190, for example, as shown in FIGS. 1A and 2A.

Here, the eye contact detection sensor 132 according to the third embodiment of the present invention includes a plurality of proximity sensors including at least a first proximity sensor 132a and a second proximity sensor 132b, and these proximity sensors are provided to different positions. These proximity sensors may be an infrared type proximity sensor, or may be composed of an induction type proximity sensor, an electrostatic capacitance type proximity sensor, an ultrasonic wave type proximity sensor, an electromagnetic wave type proximity sensor, or the like. All the proximity sensors may be of the same type, but these sensors do not have to be of the same type and proximity sensors of different types may be mixed together. These first proximity sensor 132a and second proximity sensor 132b are provided to the back face 190b of the main body 190.

Here, in the example shown in FIG. 17, the first proximity sensor 132a is arranged in the back face 190b of the main body 190 in a position on the same side as the upper face 190e above the EVF eyepiece part 174 of the display device 150 and below the upper face 190e of the main body 190. For example, the first proximity sensor 132a is arranged in the vicinity of an upper side of the EVF eyepiece part 174 on the same side as the first side face 190c.

The second proximity sensor 132b constituting another proximity sensor is arranged in the back face 190b of the main body 190 in a position closer to the second side face 190d than the EVF eyepiece part 174 of the display device 150 and closer to the first side face 190c than the second side face 190d of the main body 190. For example, the second proximity sensor 132b is arranged in the vicinity of a lower end of the EVF eyepiece part 174 on the same side as the second side face 190d.

<Action Example of Horizontal Position Shooting>

An example of a positional relationship between the arrangement of the plurality of proximity sensors and the finger of the user in a case where the user performs horizontal position shooting with the imaging apparatus 300 is described with reference to FIGS. 18 and 19. For convenience of observation, the finger of the user is depicted as a line drawing where the imaging apparatus 300 can be seen in a transparent manner. In a case that the figure of the user is depicted in figures depicted hereinafter, the line drawing similarly applies to the figures.

Figure 18:
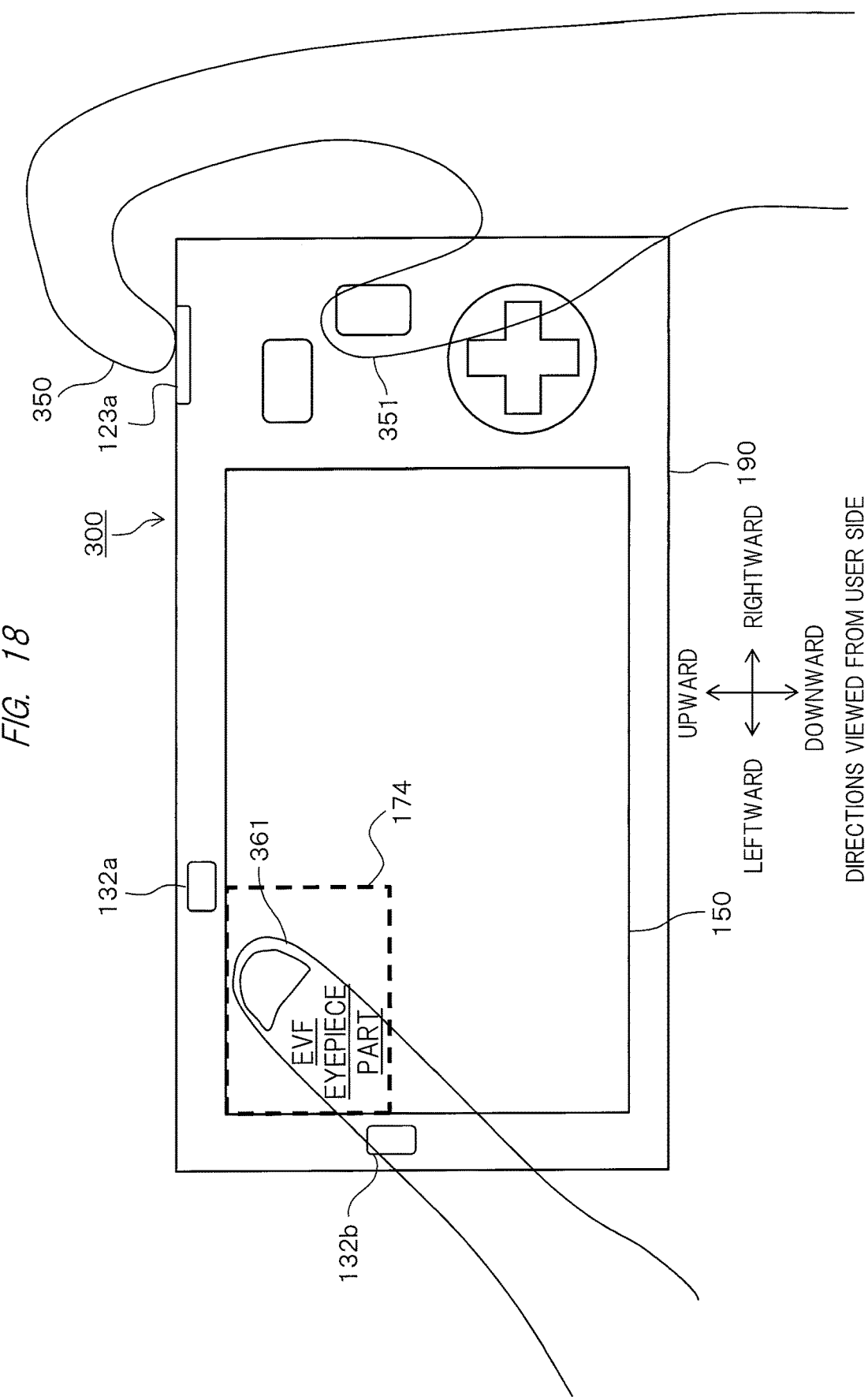
FIG. 18 is an explanation view related to the configuration of the imaging apparatus according to the third embodiment of the present invention.

First, as shown in FIG. 18, the imaging button 123a disposed on the upper face 190e of the main body 190 is so arranged as to be operable with the index finger 350 of the right hand of the user in the horizontal position shooting. At this time, the thumb 351 of the right hand of the user can operate another operation button such as the operation button 123c on the back face 190b of the main body 190. Furthermore, the other fingers are usually used to hold the main body 190 itself.

Since the right hand of the user is used for operation of the operation button on the upper face 190e of the main body 190, for operation of the operation button on the back face 190b, and for holding the main body 190 itself as described above, an operation of the touch sensor 180 on the display device 150 is consequently performed with a finger of the left hand. Here, in a state where the user has set the display device 150 in a position in front of the eyes in order to look at display of the display device 150, the position of the left shoulder of the user is lower than the height of the eyes and is disposed on the left side as viewed from the user. Then, when the user touches the vicinity of the EVF eyepiece part 174 with the index finger of the left hand, a direction of the finger naturally indicates the upper right direction as viewed from the user. Therefore, the index finger 361 of the left hand of the user may take such position as shown in FIG. 18 and cover the second proximity sensor 132b. In this case, the second proximity sensor 132b may detect approach of the index finger 361 of the left hand of the user. In this state, since the user tries a touch operation to a picture or the like displayed on the display device 150, the display states of the display device 150 and the EVF 170 of the imaging apparatus 300 must be in the "back face display mode" described in the first embodiment.

Figure 19:
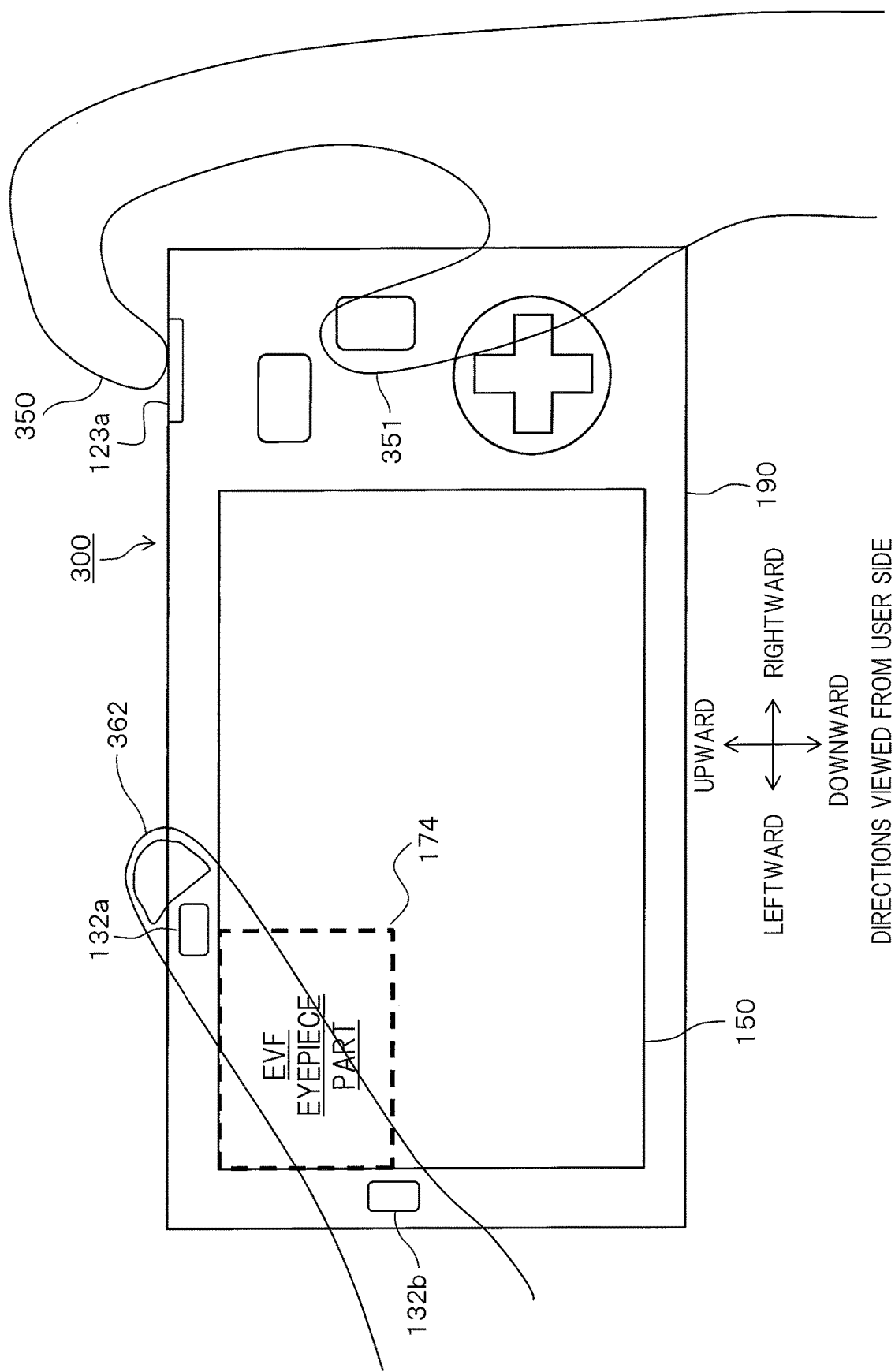
FIG. 19 is an explanation view related to the configuration of the imaging apparatus according to the third embodiment of the present invention.

However, when operation of the touch sensor 180 on the display device 150 is intended, an index finger 362 of the left hand of the user is unlikely to cover both the first proximity sensor 132a and the second proximity sensor 132b, as shown in FIG. 19. This is because in the state shown in FIG. 19, the position of the index finger 362 of the left hand of the user is disposed beyond the region of the display device 150 (the touch sensor 180), so that the touch operation cannot be fulfilled.

To the contrary, a state that the user holds the main body 190 so as to perform shooting in eye-contact with the EVF eyepiece part 174 of the main body 190 in the horizontal position shooting is shown in FIG. 20. In this case, both the first proximity sensor 132a and the second proximity sensor 132b consequently detect approach of a face part of a head 390 of the user. Of course, in this state, the display state of the display device 150 and the EVF 170 of the imaging apparatus 300 must be in the "EVF display mode" described in the first embodiment.

Then, when situations shown FIGS. 18, 19, and 20 are compared and considered, in a case where both the first proximity sensor 132a and the second proximity sensor 132b detect approach of an object in the above-described horizontal position shooting, since the user probably does not perform touch operation to the touch sensor 180 but makes eye contact with the EVF eyepiece part 174, the display state of the display device 150 and the EVF 170 of the imaging apparatus 300 only needs to be put into the "EVF display mode" described in the first embodiment. When only one of the first proximity sensor 132a and the second proximity sensor 132b detects approach of an object, since the one sensor probably detects not eye contact of the user but approach of the finger or the like for touch operation to the touch sensor 180, the display state of the display device 150 and the EVF 170 of the imaging apparatus 300 only needs to be put into the "back face display mode" described in the first embodiment.

<Action Example of Vertical Position Shooting>

Next, an example of a positional relationship between the plurality of proximity sensors and the finger of the user in a case where the user performs a vertical position shooting with the imaging apparatus 300 is described with reference to FIGS. 21 to 23.

Figure 21:
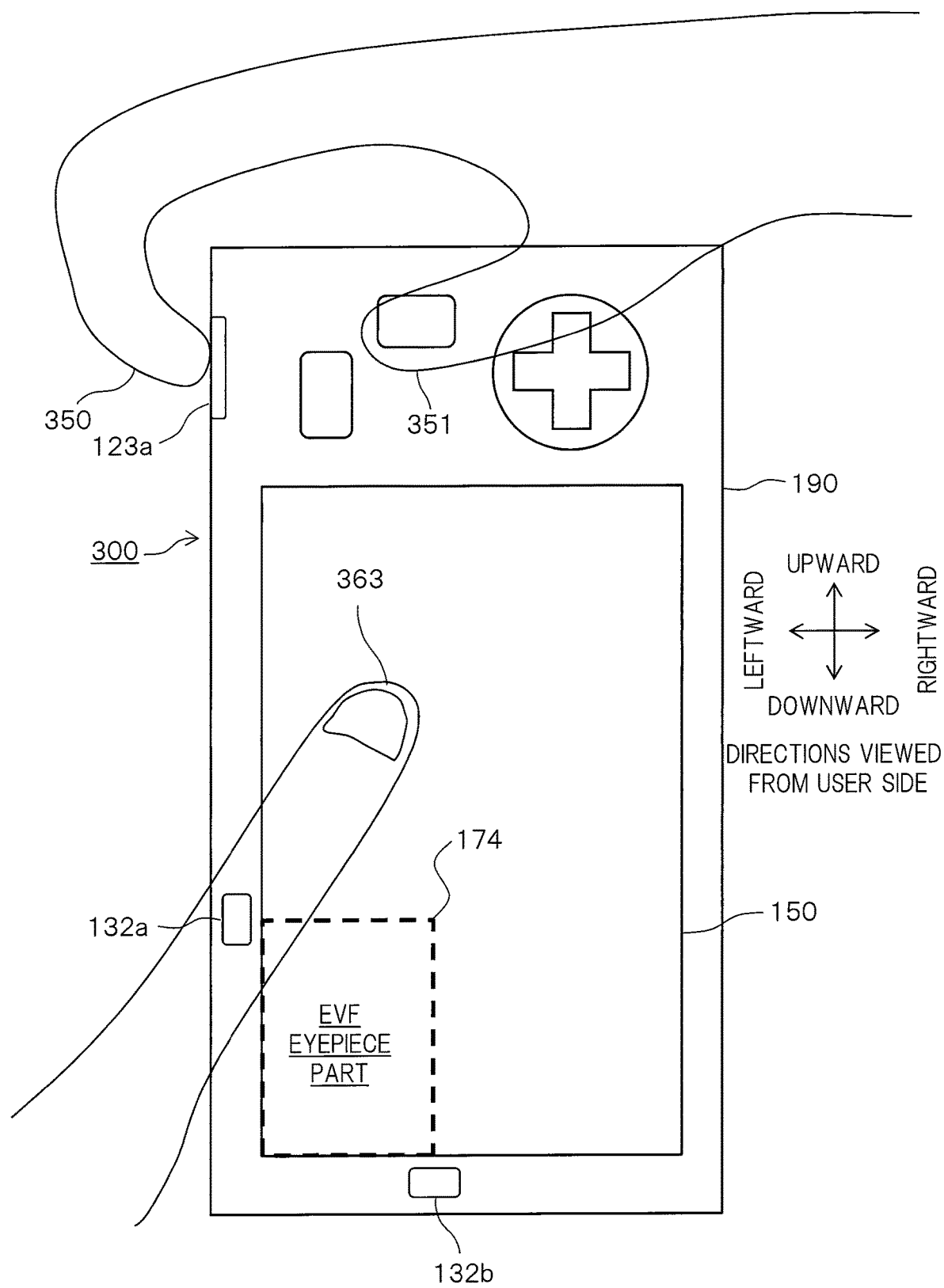
FIG. 21 is an explanation view related to the configuration of the imaging apparatus according to the third embodiment of the present invention.

First, as shown in FIG. 21, the imaging button 123a disposed on the upper face 190e of the main body 190 is also arranged so as to be operable with the index finger 350 of the right hand of the user in the vertical position shooting. At this time, the thumb 351 of the right hand of the user can operate another operation button such as the operation button 123c on the back face 190b of the main body 190. The other fingers are usually used to hold the main body 190 itself. Furthermore, as described above, the right hand of the user is used for operation of the operation button on the upper face 190e of the main body 190, for operation of the operation button on the back face 190b, and for holding the main body 190 itself.

That is, the user tilts the user's arm in accordance with the position of the imaging button 123a in finger operation of the right hand of the user to the main body 190 in the vertical position shooting, a relative positional relationship between the fingers of the right hand of the user and the main body 190 does not largely vary.

On the other hand, also in finger operation of the left hand of the user to the main body 190, a position of the left shoulder of the user is lower than the height of the eyes and is disposed on the left side as viewed from the user in a state where the user has set the display device 150 in the position in front of the eyes in order to look at display of the display device 150. Then, also in the vertical position shooting, when the user touches the vicinity of the EVF eyepiece part 174 with the index finger of the left hand, the direction of the finger naturally indicates an upper right direction as viewed from the user.

Then, as shown in FIG. 21, an index finger 363 of the left hand of the user may cover the first proximity sensor 132*a*. In this case, the first proximity sensor 132*a* may be configured to detect approach of the index finger 363 of the left hand of the user. In this state, since the user tries touch operation to a picture or the like displayed on the display device 150, the display state of the display device 150 and the EVF 170 of the imaging apparatus 300 must be in the "back face display mode" described in the first embodiment.

Figure 22:
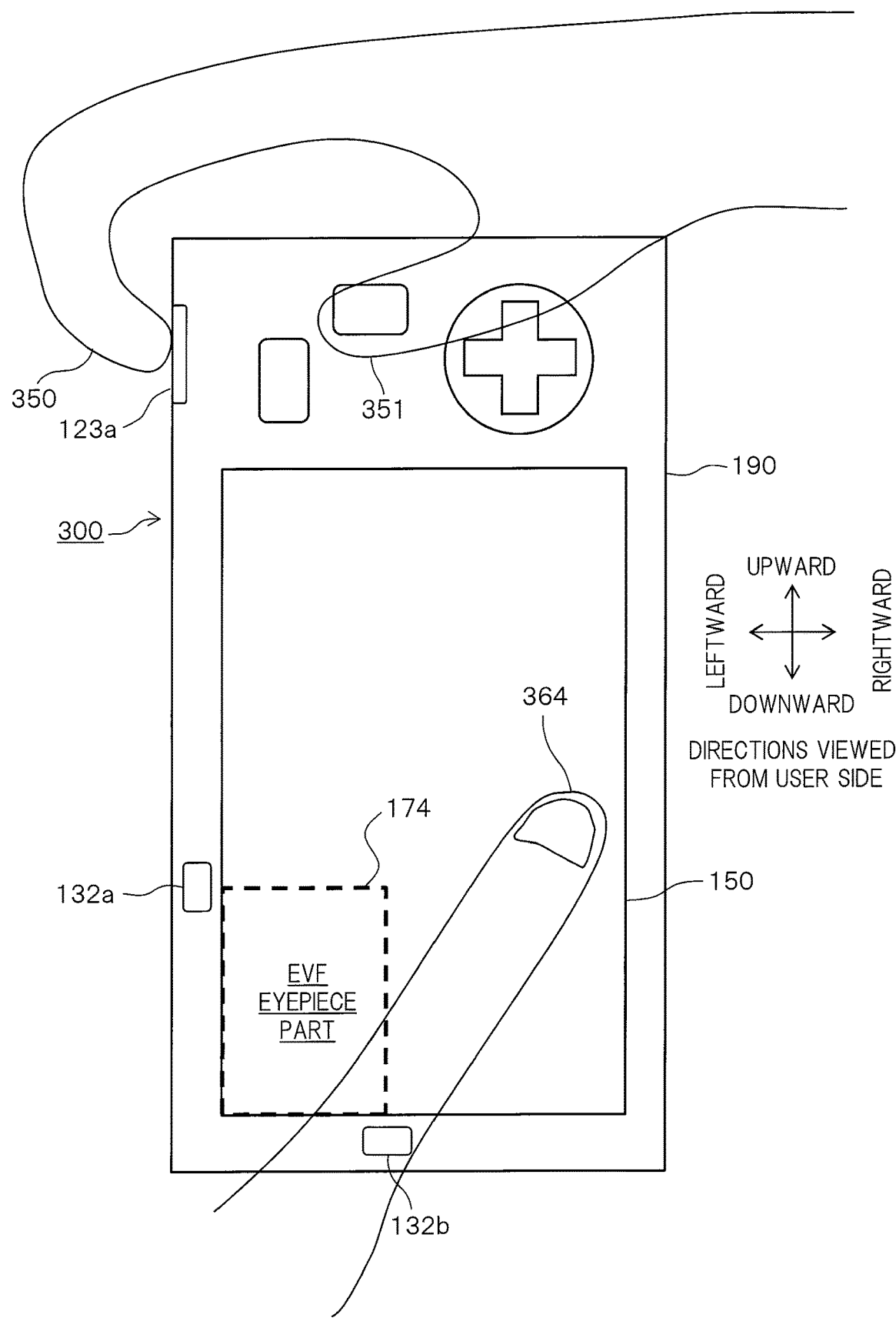
FIG. 22 is an explanation view related to the configuration of the imaging apparatus according to the third embodiment of the present invention.

Similarly, as shown in FIG. 22, an index finger 364 of the left hand of the user may cover the second proximity sensor 132*b*. In this case, the second proximity sensor 132*a* may be configured to detect approach of the index finger 364 of the left hand of the user. In this state, since the user tries touch operation to a picture or the like displayed on the display device 150, the display state of the display device 150 and the EVF 170 of the imaging apparatus 300 must be in the "back face display mode" described in the first embodiment.

Figure 23:
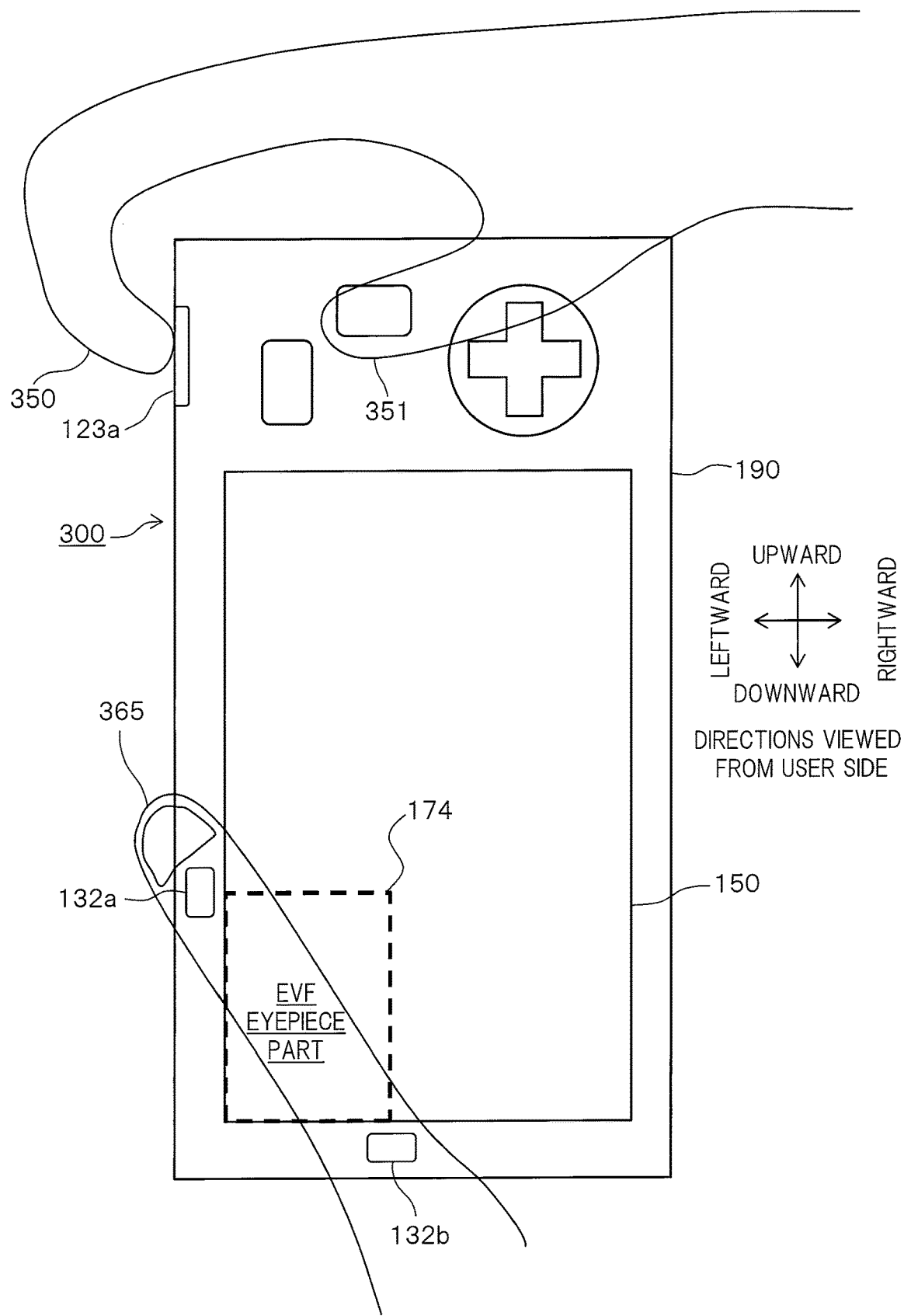
FIG. 23 is an explanation view related to the configuration of the imaging apparatus according to the third embodiment of the present invention.

However, when operation of the touch sensor 180 on the display device 150 is intended, unlike the index finger 365 of the left hand of the user shown in FIG. 23, the index finger 364 is unlikely to cover both the first proximity sensor 132*a* and the second proximity sensor 132*b*. The reason is as follows. First, as described above, in a state where the user has set the display device 150 in a position in front of the user's eyes in order to look at display of the display device 150, the left shoulder of the user is lower than the height of the user's eyes, and is disposed on the left side as viewed from the user. Here, considering the attitudes of the shoulders and the left elbow of the user, it is not easy to try to point the fingertip to the upper left as viewed from the side of the user like the index finger 365 of the left hand, with the display device 150 set in a position in front of the eyes. That is, in the imaging apparatus 300, the first proximity sensor 132*a* is arranged in a position above the EVF eyepiece part 174 of the display device 150 on the back face 190*b* of the main body 190 and below the upper face 190*e* of the main body 190, and the second proximity sensor 132*b* is arranged in a position closer to the second side face 190*d* than the EVF eyepiece part 174 of the display device 150 is on the back face 190*b* of the main body 190 and on the same side as the first side face 190*c* of the second side face 190*d* of the main body 190, so that the first proximity sensor 132*a* and the second proximity sensor 132*b* are consequently arranged in positions where it is difficult to press both the sensors with the index finger simultaneously in the vertical position shooting.

Figure 24:
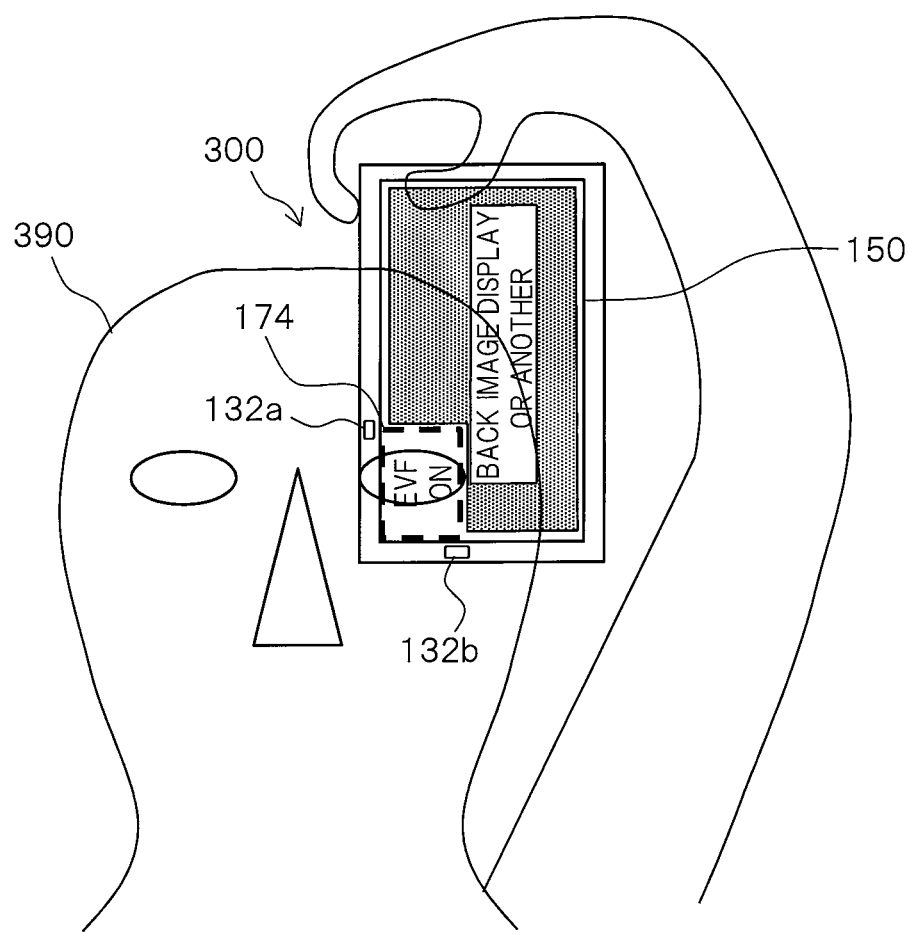
FIG. 24 is an explanation view related to the configuration of the imaging apparatus according to the third embodiment of the present invention.

On the other hand, a state in a case where the user holds the main body 190 so as to perform shooting in eye contact with the EVF eyepiece part 174 of the main body 190 in the vertical position shooting is shown in FIG. 24. In this case, both the first proximity sensor 132*a* and the second proximity sensor 132*b* consequently detect approach of the face part of the head 390 of the user. Of course, in this state, the display state of the display device 150 and the EVF 170 of the imaging apparatus 300 must be in the "EVF display mode" described in the first embodiment.

Then, when situations shown FIGS. 21, 22, 23, and 24 are compared and considered, in a case where both the first proximity sensor 132*a* and the second proximity sensor 132*b* detect approach of an object in the above-described vertical position shooting, since the user probably does not perform touch operation to the touch sensor 180 but makes eye contact with the EVF eyepiece part 174, the display state of the display device 150 and the EVF 170 of the imaging apparatus 300 only needs to be put into the "EVF display mode" described in the first embodiment. When only one of the first proximity sensor 132*a* and the second proximity sensor 132*b* detects approach of the object, since the only one sensor probably detect not eye contact of the user but approach of the finger or the like for touch operation to the touch sensor 180, the display state of the display device 150 and the EVF 170 of the imaging apparatus 300 only needs to be put into the "back face display mode" described in the first embodiment.

FIG. 25 is a table showing a comparison between states of each of the parts in the detection results of the first proximity sensor 132*a* and the second proximity sensor 132*b* in this embodiment.

When both the first proximity sensor 132*a* and the second proximity sensor 132*b* do not detect approach of an object, the controller 110 determines "a user is not making eye contact". Here, the controller 110 performs a switching operation to take the "back face display mode" where the display device 150 is turned on and the EVF 170 is turned off, for example, in the same manner as FIG. 11 of the first embodiment. At this time, when the display device 150 is a display device of the type requiring a backlight, the controller 110 turns on both the first backlight 155 and the second backlight 156. At this time, since the user may perform touch operation, touch detection processing of the touch sensor 180 is turned on. Since the other actions in the "back face display mode" is similar to those in the first embodiment, the descriptions thereof are omitted.

Furthermore, when only one of the plurality of proximity sensors detects approach of an object such as (1) when the first proximity sensor 132*a* detects approach of an object and the second proximity sensor 132*b* does not detect approach of an object or (2) when the first proximity sensor 132*a* does not detect approach of an object and the second proximity sensor 132*b* detects the approach of an object, the approach of the object detected is probably not an eye contact of the user but approach of a finger for touch operation as described regarding the example shown in FIGS. 18, 21, and 22. Therefore, the controller 110 determines "a user is not making eye contact". Also in this case, the controller 110 performs a switching operation to take the "back face display mode" where the display device 150 is turned on and the EVF 170 is turned off, for example, in the same manner as FIG. 11 of the first embodiment. At this time, since the user is probably performing touch operation, touch detection processing of the touch sensor 180 is turned on. The description of the "back face display mode" is made above and therefore omitted.

To the contrary, when both the first proximity sensor 132*a* and the second proximity sensor 132*b* detect approach of an object, it is unlike that the finger of the user for touch operation is approaching and it is likely that the user is making eye contact, as shown in FIGS. 20 and 24. Therefore, the controller 110 determines "a user is making eye contact". At this time, the controller 110 performs a switching operation to take the "EVF display mode" where the display device 150 of the EVF eyepiece part 174 is turned off and the EVF 170 is turned on, for example, in the same manner as FIG. 11 of the first embodiment. At this time, when the display device 150 is a display device of a type requiring a backlight, the controller 110 turns off both the first backlight 155 and the second backlight 156. At this time, since the display device 150 is turned off, the touch detection processing of the touch sensor 180 only needs to be turned off in principle. Since the other actions in the "EVF display mode" are similar to those in the first embodiment, the descriptions thereof are omitted. Here, in a modified example of the action of the touch screen 180 in this detection state, the touch detection processing may be turned on only in the region of a portion of the touch sensor 180 and turned off in the remaining region. This modified example is described. In this detection state, since the user is making eye contact, the face of the user is probably in contact with or is close to the touch sensor around the EVF eyepiece part 174 in the region of the touch sensor 180. However, depending on the size of the region of the touch sensor 180, a region separated from the EVF eyepiece part 174, for example, a region near an end on the same side as the first side face 190c of the region of the touch sensor 180 is neither in contact with nor close to the touch sensor. In the case of such a design, a configuration where, also in the "EVF display mode", the touch detection is turned on in a partial region near an end of the first side face 190c in the region of the touch sensor 180 so that touch operation can be performed with the thumb of the right hand of the user in this region may be also be adopted. As specific touch operation, movement of the thumb of the right hand in the touching state on the partial region is detected and the controller 110 may recognize the detected movement as a relative movement operation such as a trackball operation of a personal computer. The controller 110 can perform control such as performing movement operation of a cursor displayed on the EVF 170 on the basis of the relative movement operation.

Thus, in this embodiment, the controller 110 performs selective switching between the back face display mode and the EVF display mode on the basis of the detection results of the approach of an object obtained by the plurality proximity sensors (for example, the first proximity sensor 132a and the second proximity sensor 132b) owned by the eye contact detection sensor 132. Here, in this embodiment, also, the switching between the back face display mode and the EVF display mode includes switching between the back face live view mode and the EVF live view mode, switching between the back face playback mode and the EVF playback mode, and the like. Since specific display examples of the switching are similar to those shown in FIGS. 7, 8, and 9 of the first embodiment, the descriptions thereof are omitted.

<Modified Example of Arrangement of the EVF Contact Detection Sensor 132>

Next, a modified example of the arrangement of proximity sensors of the eye contact detection sensor 132 according to the present embodiment will be described with reference to FIGS. 26- to 30.

First, in each of FIGS. 26 to 30, a plurality of arrangement examples of the first proximity sensor 132a and the second proximity sensor 132b owned by the eye contact detection sensor 132 are shown. For example, regarding the first proximity sensor 132a, arrangement examples of a position "A" in the vicinity of an upper end portion of the EVF eyepiece part 174 on the same side as the second side face 190d, a position "B" where the end of the first proximity sensor 132a on the same side as the first side face 190c is disposed in the vicinity of a center of the EVF eyepiece part 174 in the horizontal direction, a position "C" in the vicinity of an upper end portion of the EVF eyepiece part 174 on the same side as the first side face 190c, and a position "D" slightly separated toward the first side face 190c from the upper end portion of the EVF eyepiece part 174 on the same side as the first side face 190c are shown. Regarding the second proximity sensor 132b, arrangement examples of a position "O" disposed on the same side as the upper end portion of the EVF eyepiece part 174 on the same side as the second side face 190d, a position "P" where an upper end of the second proximity sensor 132b is in the vicinity of a center of the EVF eyepiece part 174 in the vertical direction, a position "Q" in the vicinity of a lower end of the EVF eyepiece part 174 on the same side as the first side face 190c, and a position "R" slightly separated from the vicinity of the lower end of the EVF eyepiece part 174 on the same side as the first side face 190c are shown.

With reference to FIGS. 26 to 30, preferred combinations of the arrangement examples of the plurality of arrangement examples are described.

Figure 26:
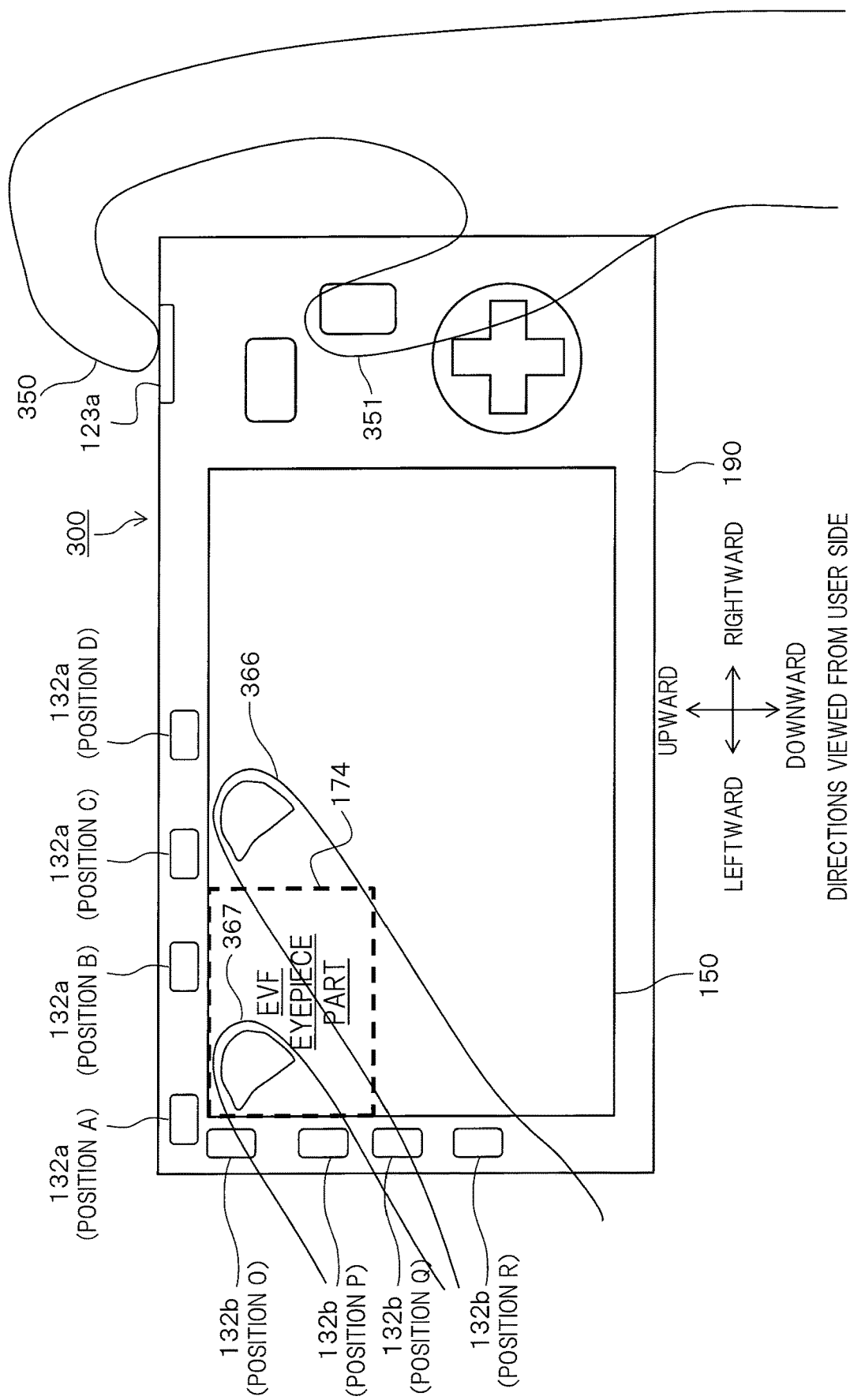
FIG. 26 is an explanation view related to the configuration of the imaging apparatus according to the third embodiment of the present invention.

FIG. 26 shows an example where the user performs the horizontal position shooting with the imaging apparatus 300. Here, in a case where the user performs touch operation to the touch sensor 180 with the index finger of the user's left hand, when the user moves the index finger of the left hand like from a position 366 of the index finger of the left hand to a position 367 of the index finger of the left hand, the index finger of the left hand covers none of the positions A, B, C, and D of the arrangement examples of the first proximity sensor 132a. That is, in the horizontal position shooting performed by the user with the imaging apparatus 300, in any of a plurality of combinations of arrangements of the positions A, B, C, or D of the arrangement examples of the first proximity sensor 132a and the position O, P, Q, or R of the arrangement examples of the second proximity sensor 132b, it is unlikely that the two proximity sensors are covered with the index finger of the left hand by the touch operation to the touch sensor 180 with the index finger of the left hand of the user.

Next, states of a plurality of arrangement examples in the case where the user performs the vertical position shooting with the imaging apparatus 300 are described. Regarding the vertical position shooting, with reference to FIGS. 21 and 22, the fact that the user can perform the touch operation to the touch sensor 180 with the index finger of the left hand in the upper right direction as viewed from the user has been described. Furthermore, with reference to FIG. 23, the fact that it is difficult for the user to perform the touch operation to the touch sensor 180 with the index finger of the left hand pointing to the upper left direction as viewed from the user has been described. Here, FIGS. 27 to 29 show examples of the directions of the index finger of the left hand excluding the directions shown in FIGS. 21 to 23 in the case where the user performs the vertical position shooting with the imaging apparatus 300.

Figure 27:
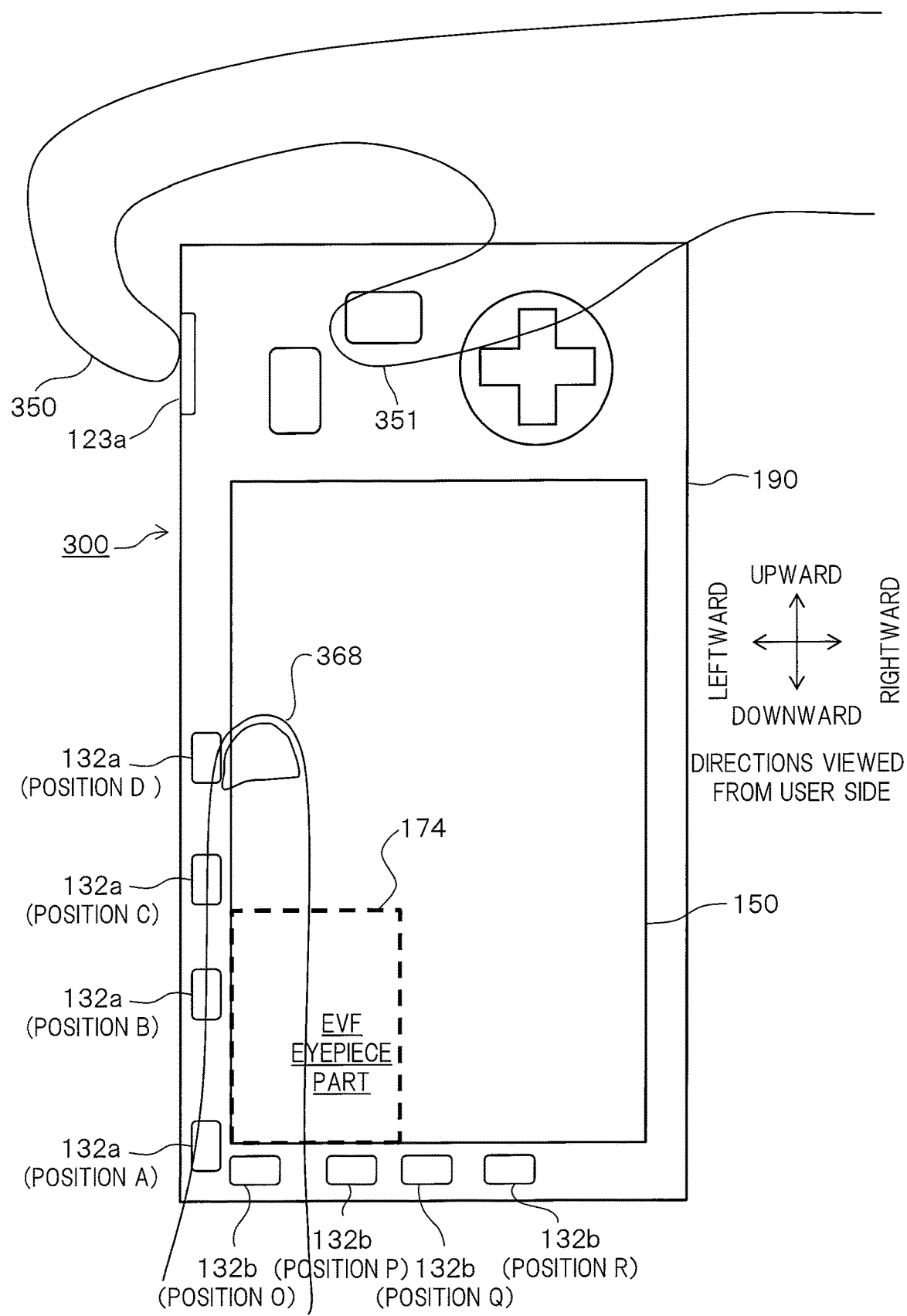
FIG. 27 is an explanation view related to the configuration of the imaging apparatus according to the third embodiment of the present invention.

First, FIG. 27 shows touch operation of touching the vicinity of an end of the touch sensor 180 of the display device 150 on the same side as the upper face 190e with an upward index finger 367 of the left hand as viewed from the user when the user performs the vertical position shooting with the imaging apparatus 300. Considering that the attitudes of the shoulders and the left elbow of the user, it is possible to point the fingertip upward, like the index finger 367 of the left hand, with the display device 150 set in a position in front of the eyes (it is relatively difficult to try to turn the fingertip of the index finger of the left hand further toward the upper left direction as viewed from the user). At this time, as shown in FIG. 27, the first proximity sensor 132a may be covered with the index finger of the left hand by a finger whichever position the first proximity sensor 132a is disposed, the position A, B, C, or D. Furthermore, in this case, the position O nearest to the end of the display device 150 on the same side as the upper face 190e in the arrangement examples of the second proximity sensor 132b is simultaneously covered with the index finger of the left hand. Then, if the second proximity sensor 132b is arranged in the position O, the touch operation of the user to the touch sensor 180 in actual use may make the first proximity sensor 132a and the second proximity sensor 132b detect the approach of the object simultaneously. Therefore, the position O is not preferable as the arrangement position of the second proximity sensor 132b in this embodiment.

Figure 28:
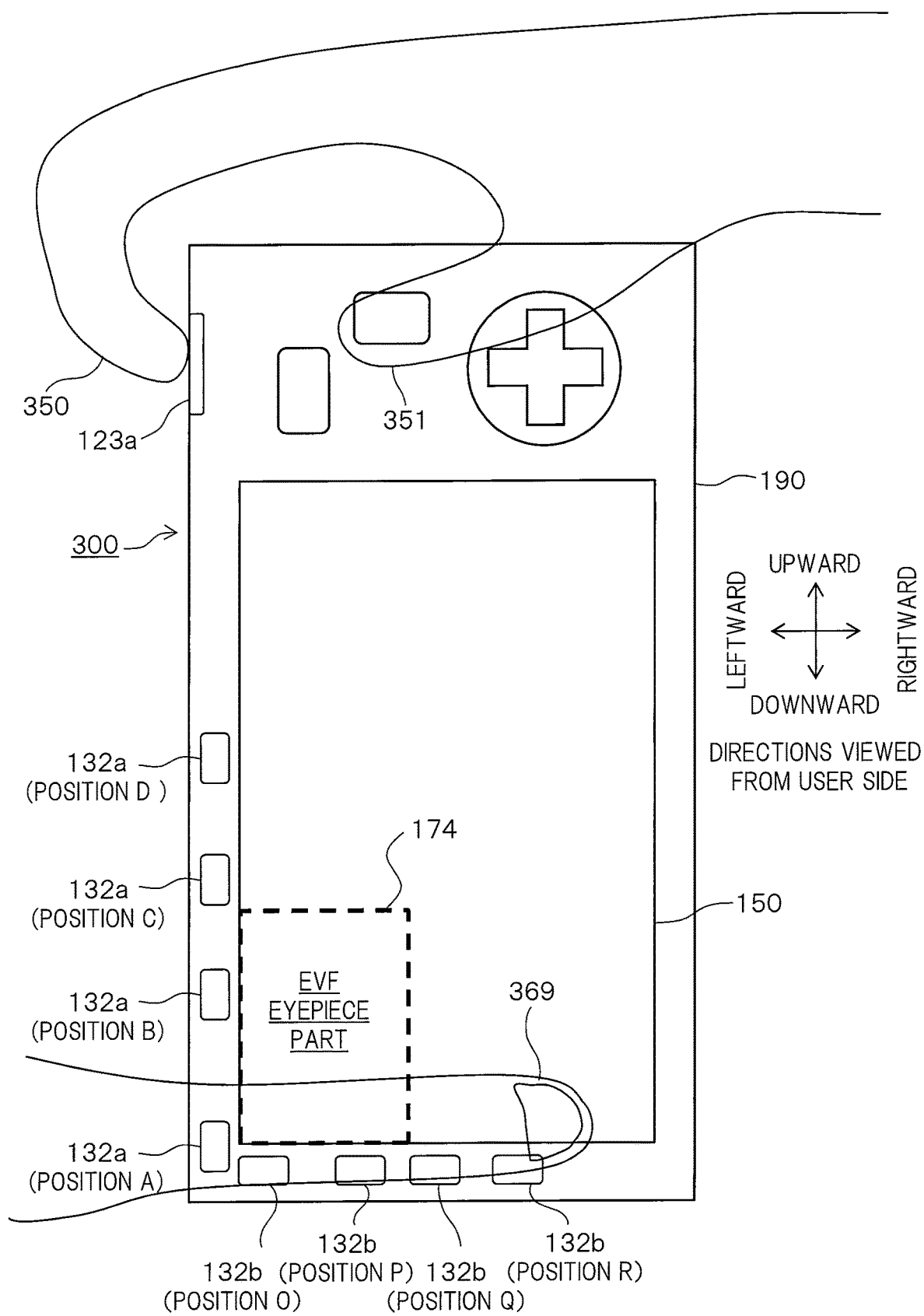
FIG. 28 is an explanation view related to the configuration of the imaging apparatus according to the third embodiment of the present invention.

Next, FIG. 28 shows touch operation of touching the touch sensor 180 on the display device 150 in the vicinity of an end of the second side face 190d with a rightward index finger 368 of the left hand as viewed from the user when the user performs the vertical position shooting with the imaging apparatus 300. Considering that the attitudes of the shoulders and the left elbow of the user, it is possible to point the fingertip rightward, like the index finger 368 of the left hand, with the display device 150 set in a position in front of the eyes (it is relatively difficult to try to turn the fingertip of the index finger of the left hand further rightward and downward as viewed from the user). At this time, as shown in FIG. 28, the second proximity sensor 132b may be covered with the index finger of the left hand whichever position the second proximity sensor 132b is disposed, the positions O, P, Q, or R. Furthermore, in this case, the position A nearest to the end of the display device 150 on the same side as the second side face 190d in the arrangement examples of the second proximity sensor 132b may be simultaneously covered with the index finger of the left hand. Then, if the first proximity sensor 132a is arranged in the position A, the touch operation of the user to the touch sensor 180 in actual use may make the first proximity sensor 132a and the second proximity sensor 132b detect the approach of the object simultaneously. Therefore, the position A is not preferable as the arrangement position of the first proximity sensor 132b in this embodiment.

Figure 29:
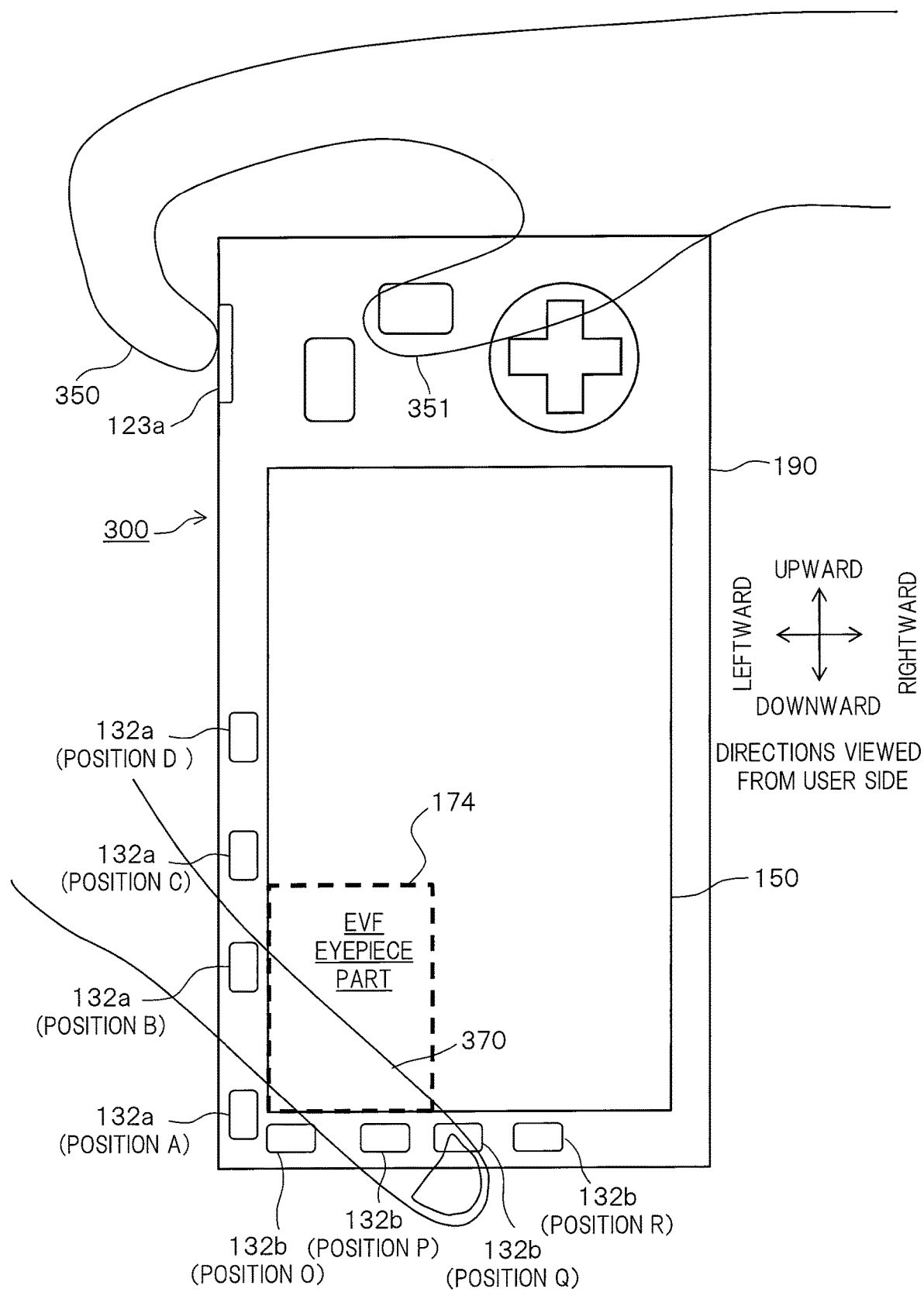
FIG. 29 is an explanation view related to the configuration of the imaging apparatus according to the third embodiment of the present invention.

Next, FIG. 29 shows touch operation of touching the touch sensor 180 on the display device 150 in the vicinity of the end of the second side face 190d with a index finger 369 of the left hand pointing to the lower right as viewed from the user when the user performs the vertical position shooting with the imaging apparatus 300. However, in a state where the user has set the display device 150 in a position in front of the eyes of the user in order to look at display of the display device 150, the position of the left shoulder of the user is lower than the height of the eyes and is disposed on the left side as viewed from the user. At this time, in a state where the user has set the display device 150 in the position in front of the eyes, the user must raise the left elbow to an unnatural height to point the fingertip to the lower right as viewed from the user, like the index finger 369 of the left hand and it is not easy for the user to do so.

Therefore, for example, if the first proximity sensor 132a is arranged at any of the positions B, C, and D excluding the position A of the positions A, B, C, and D and the second proximity sensor 132b is arranged in any of the positions B, C, and D excluding the position O of the positions O, P, Q, and R, it is very difficult for the user to cover the first proximity sensor 132a and the second proximity sensor 132b simultaneously with the index finger of the left hand by touch operation to the touch sensor 180 in actual use.

Considering the relationship between the finger of the user during the touch operation and the arrangement of the first proximity sensor 132a and the second proximity sensor 132b described above in this embodiment, a desirable arrangement of the first proximity sensor 132a and the second proximity sensor 132b in this embodiment is as shown in FIG. 30.

As shown in FIG. 30, when the imaging button 123a is arranged on the upper face 190e of the main body 190 on the same side as the first side face 190c and the EVF eyepiece part 174 is provided at an upper end on the same side as the second side face 190d of the display device 150 provided with the touch sensor 180 and having translucency, it is desirable to arrange the first proximity sensor 132a farther towards the side of the first side face 190c than the position X, and it is desirable to arrange the second proximity sensor 132b below the position Y. Specifically, the position X is a position where an end of the first proximity sensor 132a on the same side as the second side face 190d is substantially in contact with a position at a half horizontal width of the EVF eyepiece part 174 from the end of the display device 150 on the same side as the second side face 190d. The position Y is a position where the upper end of the second proximity sensor 132b is substantially in contact with a position at a half vertical width of the EVF eyepiece part 174 from the upper end of the display device 150. Such an arrangement makes it possible to avoid the state shown in FIG. 27 or 28 where the touch operation of the user to touch sensor 180 in actual use may make the first proximity sensor 132a and the second proximity sensor 132b detect the approach of the object simultaneously. It is to be noted that the size of the EVF eyepiece part 174 is usually designed on the basis of an average human eye size, and the average size of eyes of humans and an average human finger thickness are correlated, of course. Therefore, when the above-described desirable arrangement positions of the first proximity sensor 132a and the second proximity sensor 132b are expressed on the basis of the vertical width and the horizontal width of the EVF eyepiece part 174, and the expressions obtain high generality, and become applicable even to a plurality of types of imaging apparatuses 300 having the main body 190 having different sizes.

It is to be noted in the above description of this embodiment that the light-blocking member described in the second embodiment has not been described. However, the imaging apparatus 300 according to this embodiment may also be provided with the light-blocking member described in the second embodiment. In this case, the light-blocking member may be arranged between the display device 150 and the first proximity sensor 132a or the second proximity sensor 132b. Furthermore, the light-blocking member may be arranged outside the first proximity sensor 132a or the second proximity sensor 132b with respect to the display device 150.

<Advantageous Effect of this Embodiment>

According to this embodiment, in addition to the advantageous effects obtained by the above-described embodiments, the following advantageous effect can be achieved. According to this embodiment, the imaging apparatus 300 with the eyepiece part 132 having at least two proximity sensors, of the first proximity sensor 132a and the second proximity sensor 132b, and capable of determination of eye contact of the user on the basis of the detection results of the plurality of the proximity sensors is provided. Thereby, the eye contact of the user can be determined separately from the operation of the touch sensor, so that it becomes possible to provide an imaging apparatus having an advantageous effect obtained by the above-described embodiment while being mounted with a display device having a touch sensor on a back face thereof. That is, it becomes possible to provide an imaging apparatus where a display device with a touch sensor and an eyepiece part of an electronic viewfinder are arranged in a more preferable manner on back face of the main body.

Though the embodiments of the present invention have been described above, it goes without saying that a configuration achieving the technique of the present invention is not limited to these embodiments. Furthermore, a numerical value or the like appearing in the sentences or the figures is only one example, and the advantageous effects of the present invention are not impaired even when a different numerical value or the like is used.

The above-described functions and the like of the present invention may be implemented, for example, with a hardware by designing part or all thereof by an integrated circuit or the like, may be implemented with software by a computer such as microprocessor interpreting a program for fulfilling each function or the like and executing the program, or may be implemented using both hardware and software.

Furthermore, control lines and information lines considered to be necessary for description are shown in the figures, and not all control lines and information lines on a product are shown. Almost all the configurations may be considered to be mutually connected.

EXPLANATION OF REFERENCE CHARACTERS

100: Imaging Apparatus
110: Controller
131: Eye Contact Detection Sensor
150: Display Device
155: First Backlight
156: Second Backlight
170: EVF (Electronic Viewfinder)
171: EVF Display Element
172: EVF Optical System
173: EVF Darkroom
174: EVF Eyepiece Part
175: Back Face Light-Blocking Mask
190: Main Body
190b: Back Face
190c: First Side Face
190d: Second Side Face
190e: Upper Face
200: Imaging Apparatus
281, 281a, 281b, and 282: Light-Blocking Member

The invention claimed is:

1. An imaging apparatus comprising:
an imaging optical system;
an imaging element configured to receive light transmitted through the imaging optical system to generate an electric signal;
a main body;
a display device provided on a back face of the main body and capable of displaying an image generated on the basis of the electric signal generated by the imaging element; and
an electronic viewfinder provided inside the main body and capable of displaying the image generated on the basis of the electric signal generated by the imaging element,
wherein an eyepiece part of the electronic viewfinder is provided to a transmissive region of the display device,
wherein the display device is a display device of a type using backlighting to make a user visually recognize a content displayed thereon,
wherein a first backlight is arranged on a back face of a region excluding the eyepiece part in a display region of the display device, and
wherein an optical system of the electronic viewfinder and a display element of the electronic viewfinder are arranged in a space having light-blocking effect excluding the eyepiece part, and a second backlight is further arranged in the space.

2. An imaging apparatus according to claim 1, wherein an optical system of the electronic viewfinder is arranged on a back side of the eyepiece part of the electronic viewfinder provided to the transmissive region of the display device as viewed from an outside of the main body.

3. An imaging apparatus according to claim 1, wherein a light-blocking mask is provided between a region excluding the eyepiece part in a display region of the display device and an inside of the main body.

4. An imaging apparatus according to claim 1, comprising a controller, wherein
when the display device is turned on, the controller performs a switching operation to take a first display mode turning off the electronic viewfinder.

5. An imaging apparatus according to claim 1, comprising a controller, wherein
when the electronic viewfinder is turned on, the controller performs a switching operation to take a second display mode turning off a portion corresponding to the eyepiece part in a display region of the display device.

6. An imaging apparatus according to claim 5, wherein the controller displays a black image on a portion excluding the eyepiece part in the display region of the display device in the second display mode.

7. An imaging apparatus according to claim 5, wherein the controller displays an image indicating that the electric view finder is turned on, on a portion adjacent to the eyepiece part in the display region of the display device in the second display mode.

8. An imaging apparatus according to claim 1, comprising an eye contact detection sensor configured to detect an eye contact of a user in the vicinity of the eyepiece part, and a controller, wherein
when the eye contact detection sensor does not detect the eye contact of the user, the controller performs a switching control to take a first display mode turning on the display device and turning off the electronic viewfinder.

9. An imaging apparatus according to claim 8, wherein
when the eye contact detection sensor detects the eye contact of the user, the controller performs a switching control to take a second display mode turning off the display device of the eyepiece part and turning on the electronic viewfinder.

10. An imaging apparatus comprising:
an imaging optical system;
an imaging element configured to receive light transmitted through the imaging optical system to generate an electric signal;
a main body;
a display device provided on a back face of the main body and capable of displaying an image generated on the basis of the electric signal generated by the imaging element; and an electronic viewfinder provided inside the main body and capable of displaying the image generated on the basis of the electric signal generated by the imaging element, wherein an eyepiece part of the electronic viewfinder is provided to a transmissive region of the display device, and wherein a light-blocking member configured to suppress entry of light into the eyepiece part is provided to the back face of the main body, and disposed adjacent to the display device.

11. An imaging apparatus comprising:

an imaging optical system;

an imaging element configured to receive light transmitted through the imaging optical system to generate an electric signal;

a main body;

a display device provided on a back face of the main body and capable of displaying an image generated on the basis of the electric signal generated by the imaging element; and an electronic viewfinder provided inside the main body and capable of displaying the image generated on the basis of the electric signal generated by the imaging element, wherein an eyepiece part of the electronic viewfinder is provided to a transmissive region of the display device, wherein a light-blocking member configured to suppress entry of light into the eyepiece part is provided to the back face of the main body, and disposed adjacent to the display device, wherein the light-blocking member is provided to the display device, and is disposed on a second side face defined as the right side face relative to a front face of the main body and on an upper face side of the main body on the display device, and wherein the light-blocking member extends in a short-side direction of the display device on the second side face side of the main body, and extends in a longitudinal direction of the display device on the upper face side of the main body.

12. An imaging apparatus according to claim 11, wherein on the upper face side of the main body, the light-blocking member is two or more times longer than the eyepiece part in the longitudinal direction of the display device.

13. An imaging apparatus according to claim 11, wherein the light-blocking member is provided to the display device, and disposed on a first side face defined as the left side face relative to the front face of the main body, and the light-blocking member extends in the short-side direction of the display device on the first side face of the main body.

14. An imaging apparatus comprising:

an imaging optical system;

an imaging element configured to receive light transmitted through the imaging optical system to generate an electric signal;

a main body;

a display device provided on a back face of the main body and capable of displaying an image generated on the basis of the electric signal generated by the imaging element; and an electronic viewfinder provided inside the main body and capable of displaying the image generated on the basis of the electric signal generated by the imaging element, wherein an eyepiece part of the electronic viewfinder is provided to a transmissive region of the display device, wherein a touch sensor is provided on the display device, wherein a plurality of proximity sensors arranged in respective positions different from each other on a back face of the main body are provided, wherein the imagining apparatus further comprises: a controller, and wherein the controller is configured to determine whether a user is making eye contact according to a combination of detection of an approach of an object by the proximity sensors.

15. An imaging apparatus comprising:

an imaging optical system;

an imaging element configured to receive light transmitted through the imaging optical system to generate an electric signal;

a main body;

a display device provided on a back face of the main body and capable of displaying an image generated on the basis of the electric signal generated by the imaging element; and an electronic viewfinder provided inside the main body and capable of displaying the image generated on the basis of the electric signal generated by the imaging element, wherein an eyepiece part of the electronic viewfinder is provided to a transmissive region of the display device, wherein a touch sensor is provided on the display device, wherein a plurality of proximity sensors arranged in respective positions different from each other on a back face of the main body are provided, wherein the imagining apparatus further comprises a controller, wherein the proximity sensors include a first proximity sensor and a second proximity sensor arranged in the back face of the main body in different positions on the back face of the main body, wherein the controller is configured to:

determine that a user is not making eye contact when neither the first proximity sensor nor the second proximity sensor detects an approach of an object, determine that a user is not making eye contact when either one of the first proximity sensor and the second proximity sensor detects the approach of the object and the other does not detect approach of an object, and determine that a user is making eye contact when both the first proximity sensor and the second proximity sensor detect the approach of the object.

16. An imaging apparatus comprising:

an imaging optical system;

an imaging element configured to receive light transmitted through the imaging optical system to generate an electric signal;

a main body;

a display device provided on a back face of the main body and capable of displaying an image generated on the basis of the electric signal generated by the imaging element; and an electronic viewfinder provided inside the main body and capable of displaying the image generated on the basis of the electric signal generated by the imaging element, wherein an eyepiece part of the electronic viewfinder is provided to a transmissive region of the display device, wherein a touch sensor is provided on the display device, wherein a plurality of proximity sensors arranged in respective positions different from each other on a back face of the main body are provided, wherein a front face of the main body is configured to allow the imaging optical system of the imaging apparatus to take in light, wherein the back face of the main body is configured to have the display device arranged in a horizontally long and rectangular shape, wherein the main body has an upper face and a bottom face, wherein a first side face and a second side face are respectively disposed at left and right sides of the main body with respect to the front face, wherein the first side face and the second side face are disposed on opposite sides of the main body, wherein an imaging button is provided on the upper face of the main body on the same side as the first side face of the main body, wherein the eyepiece part is provided to the transmissive region of the display device on the same side as the second side face of the main body and on the same side as the upper face of the main body, and wherein the proximity sensors include: a first proximity sensor arranged in a position near an upper face of the display device on the back face of the main body; and a second proximity sensor arranged in a position on the same side as the second side face of the display device on the back face of the main body.

17. An imaging apparatus according to claim 16, wherein the first proximity sensor is arranged on the back face of the main body on the same side as the upper face of the display device and on a farther position towards the first side face than a center of the eyepiece part, and the second proximity sensor is arranged on the back face of the main body on the same side as the second side face of the display device and on a farther position towards the bottom face than the center of the eyepiece part.

18. An imaging apparatus according to claim 16, comprising a controller, wherein the controller is configured to determine that a user is not making eye contact when neither the first proximity sensor nor the second proximity sensor detects an approach of an object, to determine that a user is not making eye contact when either one of the first proximity sensor and the second proximity sensor detects an approach of an object and the other does not detect approach of an object, and to determine that that a user is making eye contact when both the first proximity sensor and the second proximity sensor detect approach of an object.

* * * * *